(12) United States Patent
Yan et al.

(10) Patent No.: US 10,208,428 B2
(45) Date of Patent: Feb. 19, 2019

(54) COATED PAPER

(71) Applicant: ENCAPSYS, LLC, Baltimore, MD (US)

(72) Inventors: Nianxi Yan, Appleton, WI (US); John Charles Debraal, Appleton, WI (US)

(73) Assignee: ENCAPSYS, LLC, Baltimore, MD (US)

( * ) Notice: Subject to any disclaimer, the term of this patent is extended or adjusted under 35 U.S.C. 154(b) by 0 days.

(21) Appl. No.: 14/136,663

(22) Filed: Dec. 20, 2013

(65) Prior Publication Data

US 2014/0370271 A1 Dec. 18, 2014

Related U.S. Application Data

(60) Provisional application No. 61/836,017, filed on Jun. 17, 2013.

(51) Int. Cl.
*D21H 19/38* (2006.01)
*C09C 1/36* (2006.01)
*D21H 25/14* (2006.01)
*C09C 3/10* (2006.01)

(52) U.S. Cl.
CPC ......... *D21H 19/385* (2013.01); *C09C 1/3676* (2013.01); *C09C 3/10* (2013.01); *D21H 25/14* (2013.01); *C01P 2004/03* (2013.01); *C01P 2004/04* (2013.01); *C01P 2006/10* (2013.01); *C01P 2006/40* (2013.01); *C01P 2006/60* (2013.01); *C01P 2006/62* (2013.01); *C01P 2006/63* (2013.01); *C01P 2006/64* (2013.01); *Y10T 428/25* (2015.01); *Y10T 428/254* (2015.01); *Y10T 428/256* (2015.01)

(58) Field of Classification Search
None
See application file for complete search history.

(56) References Cited

U.S. PATENT DOCUMENTS

| 3,133,893 | A | 5/1964 | Newman |
| 4,771,086 | A | 9/1988 | Martin |
| 7,960,026 | B2 | 6/2011 | Koller et al. |
| 8,067,089 | B2 | 11/2011 | Schwantes |
| 8,236,431 | B2 | 8/2012 | Mukkamala |
| 2004/0151910 | A1* | 8/2004 | Koller et al. ............... 428/403 |
| 2008/0081175 | A1* | 4/2008 | Mukkamala ............ 428/317.3 |

FOREIGN PATENT DOCUMENTS

EP 1911881 A1 4/2008

* cited by examiner

*Primary Examiner* — Chinessa T. Golden
(74) *Attorney, Agent, or Firm* — Muncy, Geissler, Olds & Lowe, P.C.

(57) ABSTRACT

A coated paper with enhanced properties and/or lower cost can be obtained by using a coating that contains a binder and stanchion-encapsulated titanium dioxide. The stanchion-encapsulated titanium dioxide can provide the same or similar brightness, gloss, and/or opacity while using less titanium dioxide.

22 Claims, 19 Drawing Sheets

Figure 15. Comparison of Opacity of Paper Coating With Binder-Only Formula.
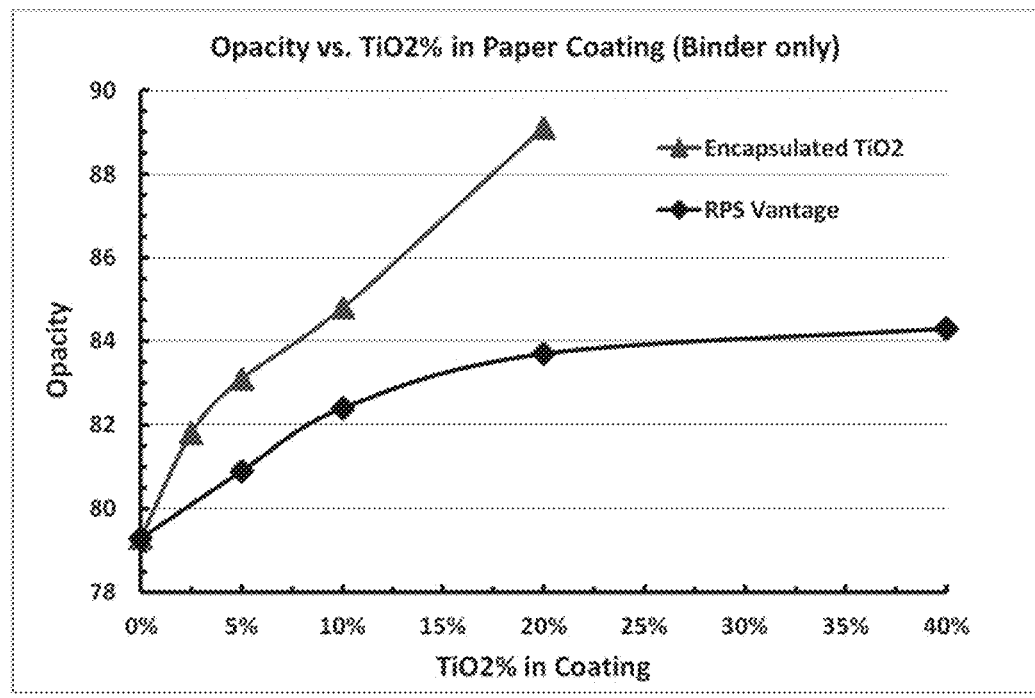
Figure 16. Comparison of Opacity of Paper Coating With Coated Free Sheet Formula.
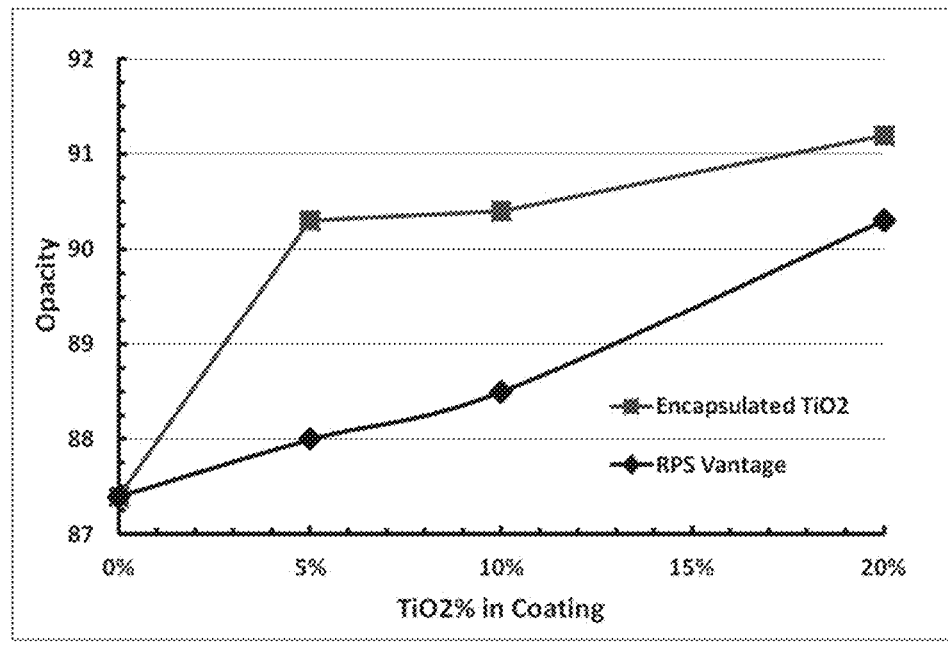

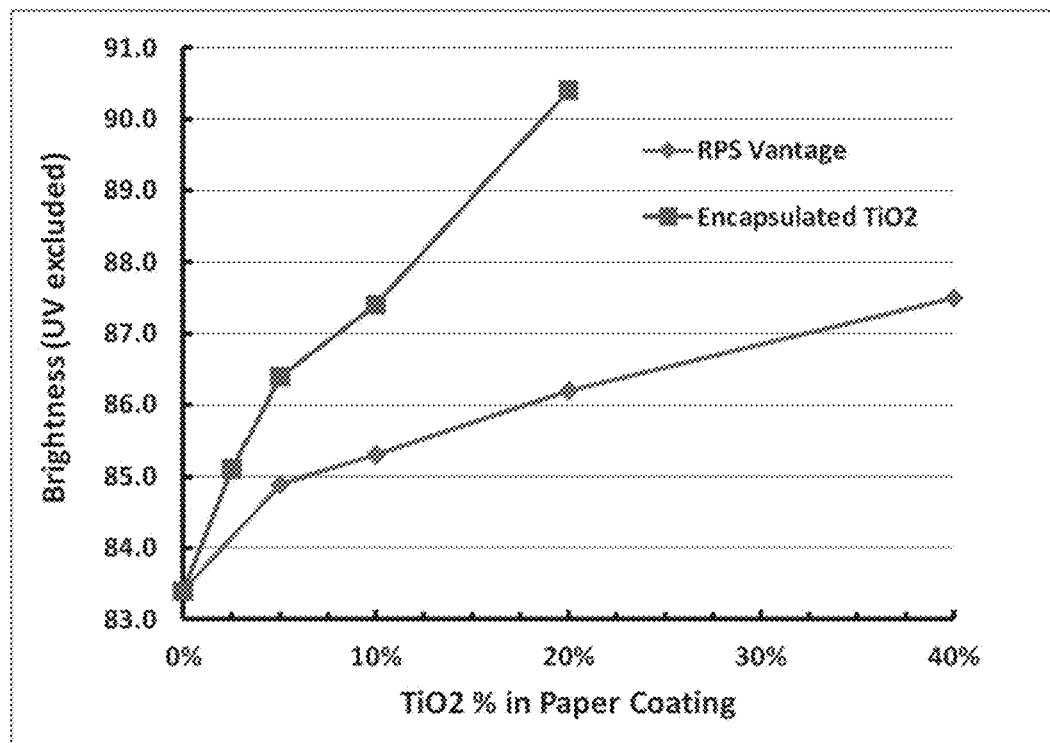
Figure 17. Comparison of Brightness of Coated Paper
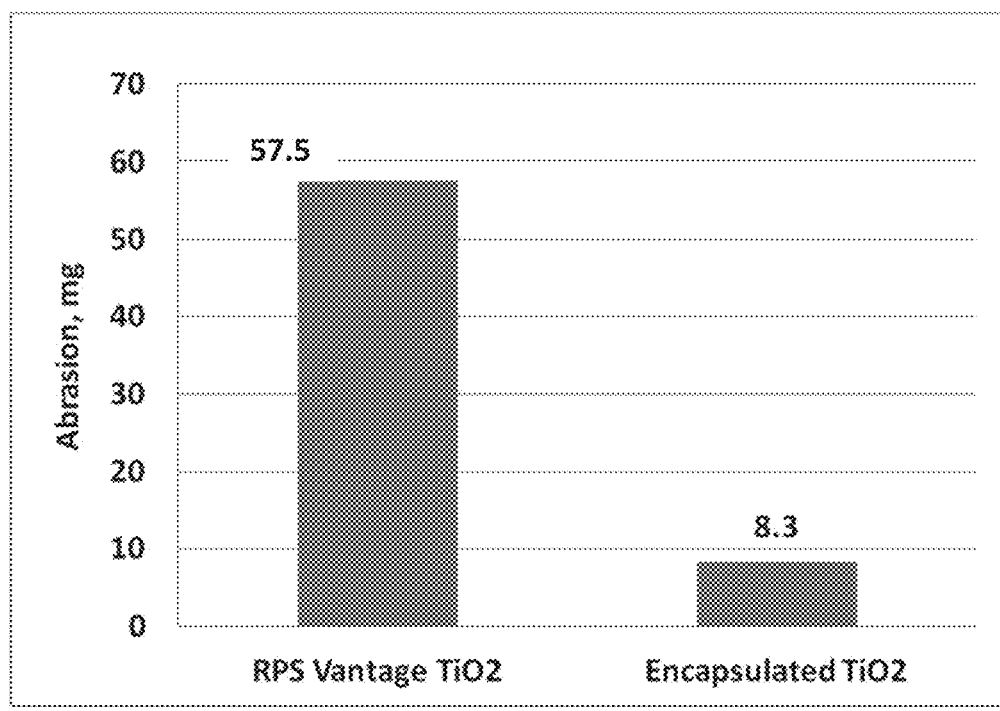
Figure 18. Comparison of Abrasion with Einlehner Abrasion Test.

Figure 19. Comparison of Paper Coating Gloss at 75 Degree.
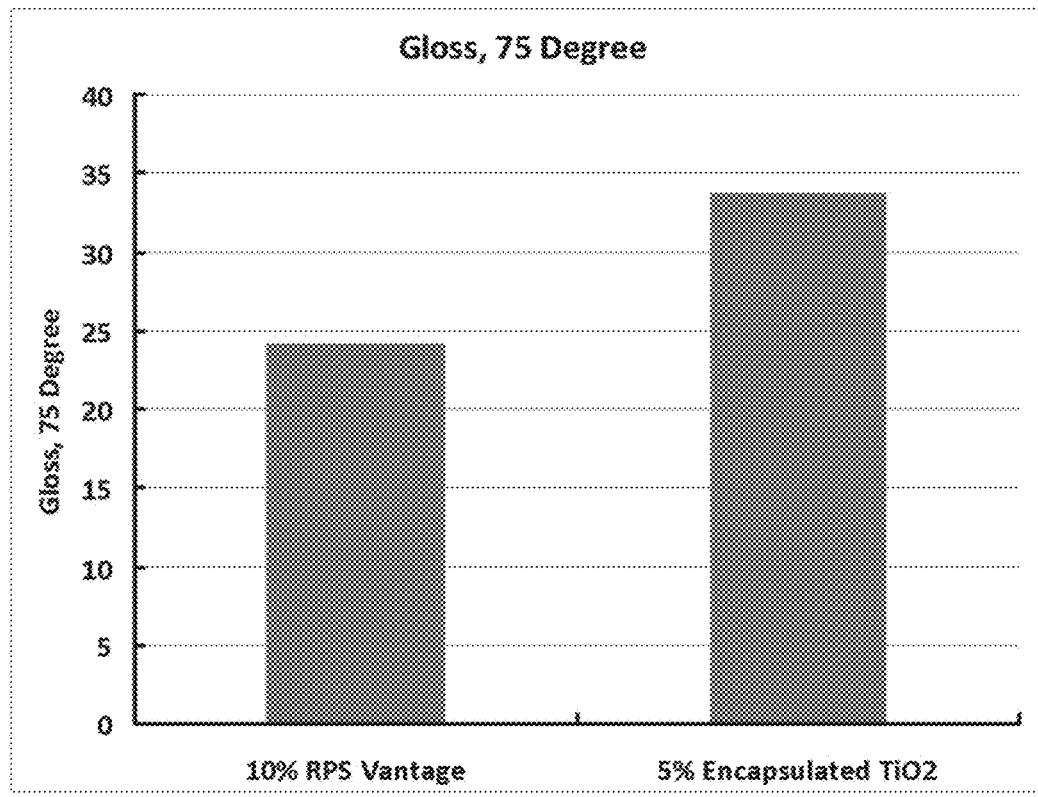
Figure 20. Comparison of Paper Coating Gloss at Different Calender Pressure.
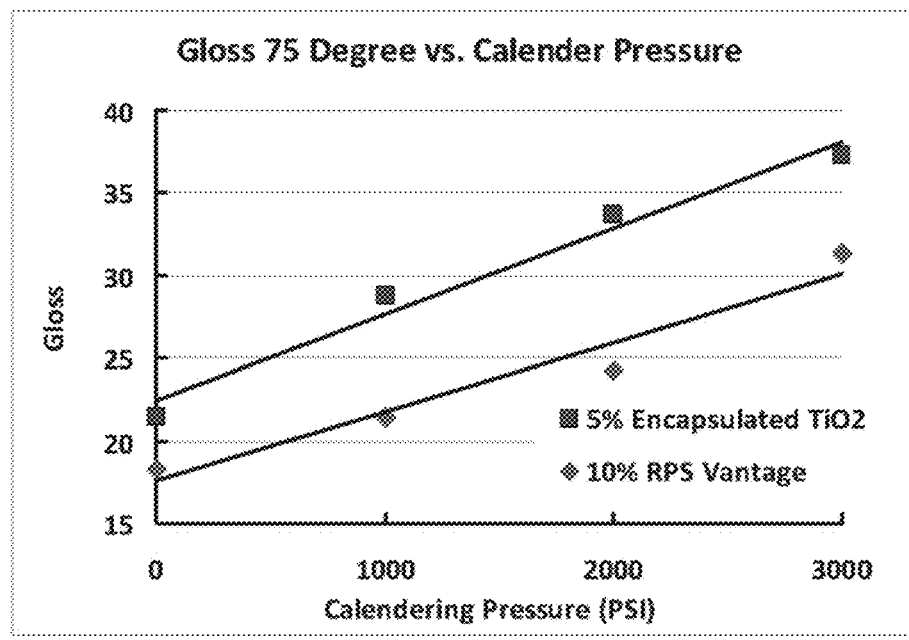

Figure 21. Comparison of Sheffield Smoothness of Paper Coatings.
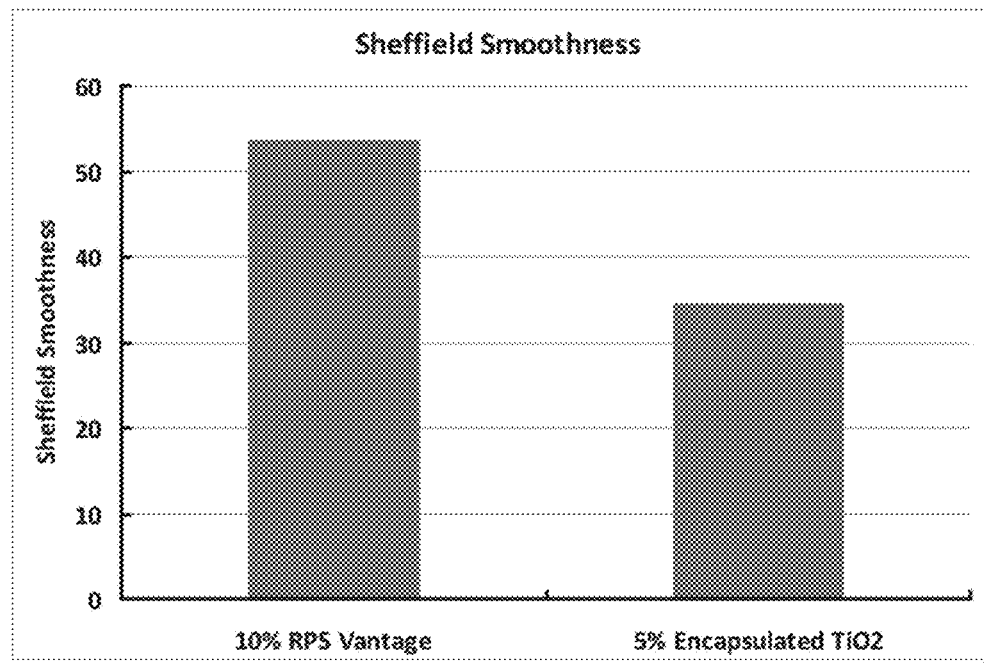
Figure 22. Comparison of Opacity of Paper.
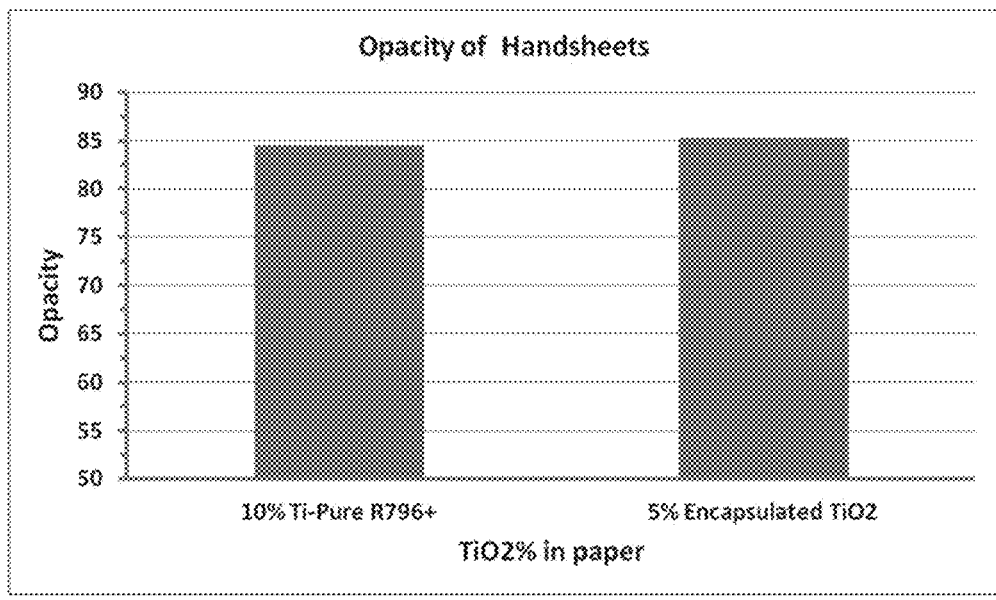

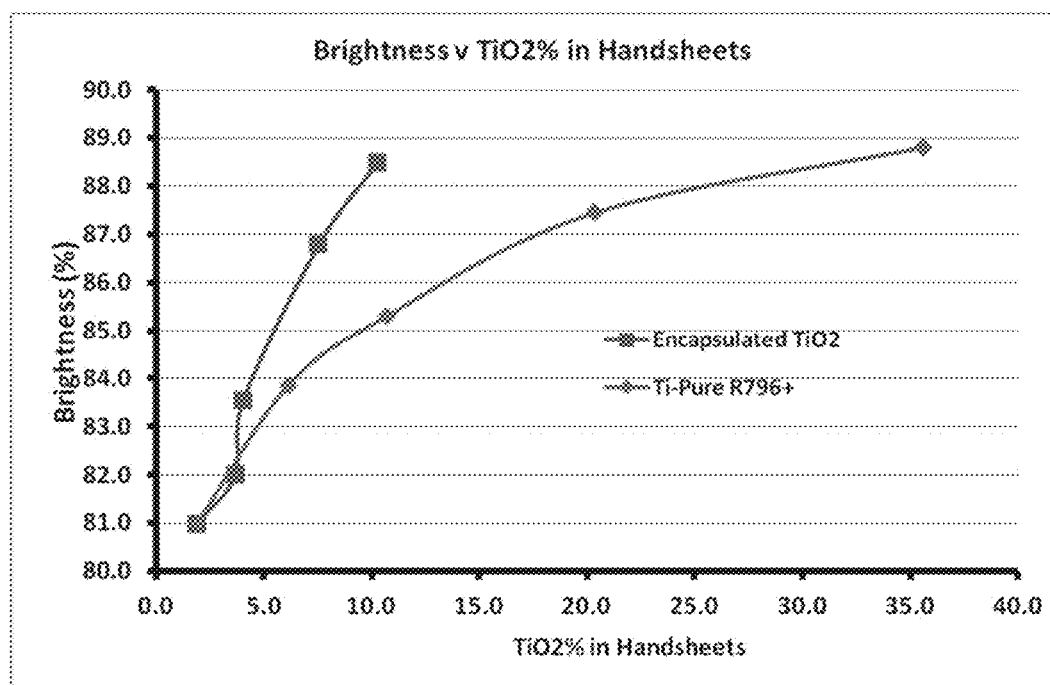
Figure 23. Comparison of Brightness of Paper.

COATED PAPER

CROSS REFERENCE TO RELATED APPLICATIONS

This application claims priority of U.S. Provisional Application No. 61/836,017 filed on Jun. 17, 2013 under 35 U.S.C. § 119(e), the entire contents of all of which are hereby incorporated by reference.

FIELD OF DISCLOSURE

The present invention relates to coated paper wherein the coating contains an encapsulated pigment such as titanium dioxide that facilitates enhanced brightening efficiencies. The invention also relates to a coating composition therefor.

BACKGROUND

Titanium dioxide has many uses. As a pigment, titanium dioxide is typically used as a powder, that is, as fine particles having a particle size generally in the range of 100 to 500 nm. It is often used in paper making and in paints, where it can increase brightness and opacity, and is also used in textiles, etc. Though commonly available as a powder/pigment, a coated form of titanium dioxide has been suggested.

For example, U.S. Pat. No. 3,133,893 relates to pigment particles coated with a polymer. The coated pigments are used in coloring plastic fibers. The polymer coating is formed by in situ polymerization. By coating the pigment with a polymer coating, the pigment is thought to be susceptible to forming a stable and fine dispersion within a resin or resin solution without the need for extensive milling. The polymer can be formed from any vinyl monomer and generally is identical or compatible with the composition to be pigmented. Acrylonitrile is used mostly in the examples. Examples 3, 6, and 17 use titanium dioxide as the pigment to be coated.

U.S. Pat. No. 4,771,086 relates to polymer coating of pigment particles for use in paint. The process of coating the pigment particles uses otherwise conventional aqueous-based emulsion polymerization, except that the then typical anionic emulsification and stabilizing agent is replaced with a nonionic stabilizing agent that is sufficient to serve as an emulsifying agent. This change in emulsification agent purportedly results in polymerization exclusively on the surface of the pigment particle and forms a uniform thickness of polymer coating thereon. In contrast, the use of conventional anionic emulsification agents is taught to yield essentially bulk polymerization with a mass having a consistency ranging from cottage cheese to lumpy dough to a sticky plastic and which is reportedly not of any practical value. The resulting coated pigment particles are taught to have "extraordinary" stability against flocculation or settling in comparison with conventional latex systems. Also, the coated pigments are taught to be capable of achieving improved covering power and surface gloss. Titanium dioxide is mentioned and exemplified as a useful pigment to be polymer coated.

U.S. Pat. No. 7,960,026 also relates to a coated pigment for use in paint. The coated pigment is formed by first adhering polymer particles onto the surface of the inorganic pigment to form a "Primary Composite Particle." This Primary Composite Particle is then subjected to emulsion polymerization to form a polymer layer around the Primary Coated Polymer. The patentees theorized that the polymer particles attached to the inorganic pigment particle serve as seed polymers to promote formation of the polymer layer around the Primary Coated Polymer during the polymerization step. Titanium dioxide is disclosed and exemplified as an inorganic pigment. The composite particles are taught to provide superior covering/opacity and gloss.

It would be desirable to have a paper that could be made at lower cost and/or have superior properties such as opacity, brightness, abrasion and gloss.

SUMMARY OF THE INVENTION

The present invention relates to the use of a type of polymer coated titanium dioxide in a paper coating. Accordingly, a first aspect of the invention relates to a coated paper comprising a base paper having a coating thereon; wherein the coating comprises a binder and stanchion-encapsulated titanium dioxide. The stanchion-encapsulated titanium dioxide is described more fully below. Briefly, such encapsulation refers to the presence of polymer extensions or "stanchions" on the coated titanium dioxide particles, which stanchions may link nearby coated particles together. The coating may contain additional pigments such as calcium carbonate and/or days, e.g., kaolin. Other additives may also be present. The base paper is not limited and includes paperboard.

Another aspect of the invention relates to a paper coating composition, which comprises a mixture of water, a binder, and stanchion-encapsulated titanium dioxide. The coating composition may further contain additional pigments such as calcium carbonate and/or clays and additives.

A further aspect of the invention relates to paper produced by coating a base paper with the above coating composition. The coated paper may be subsequently subjected to calendaring or not.

BRIEF DESCRIPTION OF THE DRAWINGS

The accompanying drawings are presented to aid in the description of embodiments of the invention and are provided solely for illustration of the embodiments and not limitation thereof.

FIG. 15 presents a comparison of opacity of a paper coating according to the invention compared to paper coatings with conventional $TiO_2$.

FIG. 16 presents a comparison of opacity of a coated free sheet paper coating.

FIG. 17 presents a comparison of brightness of coated paper according to the invention compared to a conventional TiO2.

FIG. 18 presents a comparison of abrasion.

FIG. 19 presents a comparison of gloss of coated paper according to the invention as compared to a coated paper with a conventional TiO2.

FIG. 20 presents paper coating gloss at different calendar pressures.

FIG. 21 presents a comparison of Sheffield Smoothness of paper coated according to the invention as compared to a conventional TiO2 coating.

FIG. 22 presents opacity comparisons of paper.

FIG. 23 presents a comparison of brightness of paper.

DETAILED DESCRIPTION

Figure 1:
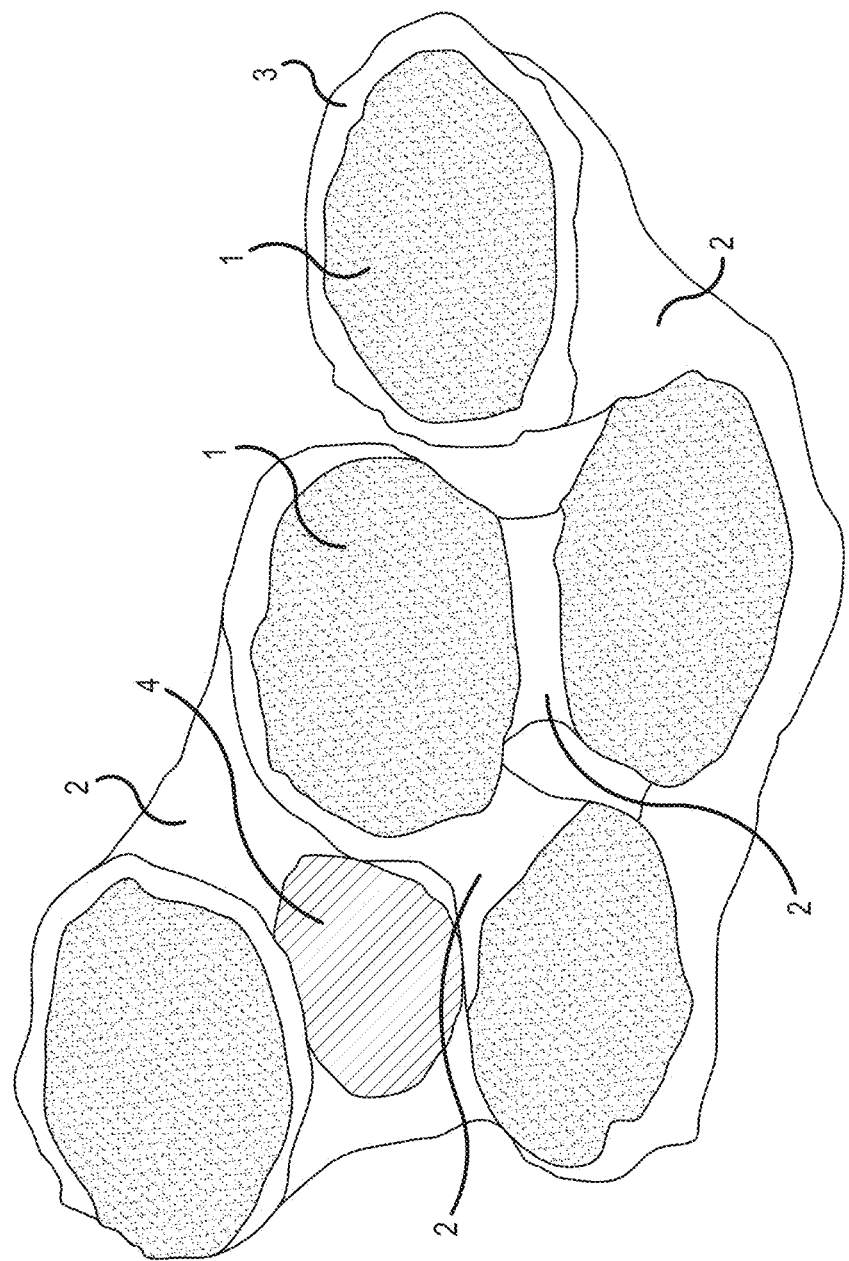
FIGS. 1 and 2 are drawings of a particle composition consistent with the present invention.

The present invention is based on the discovery that stanchion-encapsulated titanium dioxide can provide advantages to coated paper materials. The basic coated paper of the present invention comprises base paper having a coating thereon of at least a binder and stanchion-encapsulated titanium dioxide. The base paper typically has two major sides or surfaces. Only one major side needs to be coated, but both sides can also be coated in the present invention. The base paper, as is well known in the art, refers to an amalgamation of vegetable, wood, and/or synthetic fibers, typically cellulose, hemi-cellulose, lignin, or synthetic. In addition to the fibers, fillers and other additives may be present in the base paper. These fillers/additives include various clays as is well known in the art. A thicker and/or stiffer paper may be referred to as a paper board. Both paper and paper board are considered to be "base paper" for the purposes of the present invention, unless otherwise indicated.

The invention can also be useful with other pigment materials such as carbon black, mica, silica, calcium carbonate, barium sulfate, zinc oxide, lead oxide, zinc sulfate, iron oxide, talc, clays, kaolinite, montmorillonite, smectite, illite, and chlorite.

The coating on the base paper contains a binder as are conventionally used in the art. The binder materials can be polymeric or latex and are typically substantially vehicle soluble or dispersible. Preferred water soluble binders include polyvinyl alcohol, hydroxy ethylcellulose, methylcellulose, methyl-hydroxypropylcellulose, starch, modified starches, gelatin and the like and combinations thereof. Alternatively, or in addition, binder materials can include eligible latex materials include polyacrylates, styrene-butadiene-rubber latexes, polyvinylacetates, polystyrene, and the like and combinations thereof. Binders should be present in an amount to facilitate sufficient adherence such as to the surface when applied as part of a coating or to surface fibers when applied as a filler.

Typically the binder is present in the coating in an amount from 10 to 50%.

The stanchion-encapsulated titanium dioxide is a plurality of polymer-coated titanium dioxide pigment particles wherein the polymeric coating at least partially surrounds each pigment particle and provides stanchions, on at least 10% of the pigment particles, extending from the coating layer so as to protrude outwardly or to connect two or more pigment particles together. A stanchion, which is made out of polymer material, must protrude at least two times the standard coating thickness, or, connect two pigment particles together. Typically the stanchion has a length of 10 to 500 nm. Alternatively, the stanchion length can be related to the diameter of the coated particle and is typically in the range from 0.01 d to about 3.5 d, or even from 0.1 d to about 2 d, or even from 0.5 d to 1 d, where d is the polymer coated particle diameter. In addition, each stanchion can have a width, for example, of less than about 2× the radius of the coated particle from which the stanchion extends. The average number of stanchions per pigment particle is typically in the range from 0.1 to 10, more typically 0.2 to 6.

The stanchion-encapsulated titanium dioxide may contain additional internal structures that separate coated pigment particles. These structures are formed by stanchions and/or coating layers combining to form small spherical structures. These structures are called "particle separators." The discrete particles separators cause separation of the particles and have a size range between 1 nm to 5 um (microns), or even from 1 nm to 2 um or even from 1 nm to 1.5 um or even from 1 nm to 100 um. A typical range for the size of the particle separators is from 5 nanometers to 1500 nanometers. For clarity, the occurrence of particle separators is optional and not necessarily required or present in a stanchion-encapsulated titanium dioxide.

The stanchions in the encapsulated titanium dioxide contribute to an increased spacing between the coated particles in the composition. The particle separators, if present, can also contribute to an increased spacing between the coated particles in the composition. Thus, the stanchions, and particle separators, individually or combined, allow for a reduced density of the coated particles and lead to higher opacity values when the particle composition is used in a coating for paper. In addition, the stanchions of the present invention allow tier a stable suspension and a higher level of brightness in a coating.

The stanchion-encapsulated titanium dioxide as used in the present invention is illustrated in the figures. In FIG. 1, titanium dioxide pigment particles II are depicted surrounded by polymeric coating 3. The stanchions 2 can form bridging between the particles or protrusions. Stanchions 2 can be of the same material as polymeric coating 3 or optionally of a different polymeric material.

Figure 14:
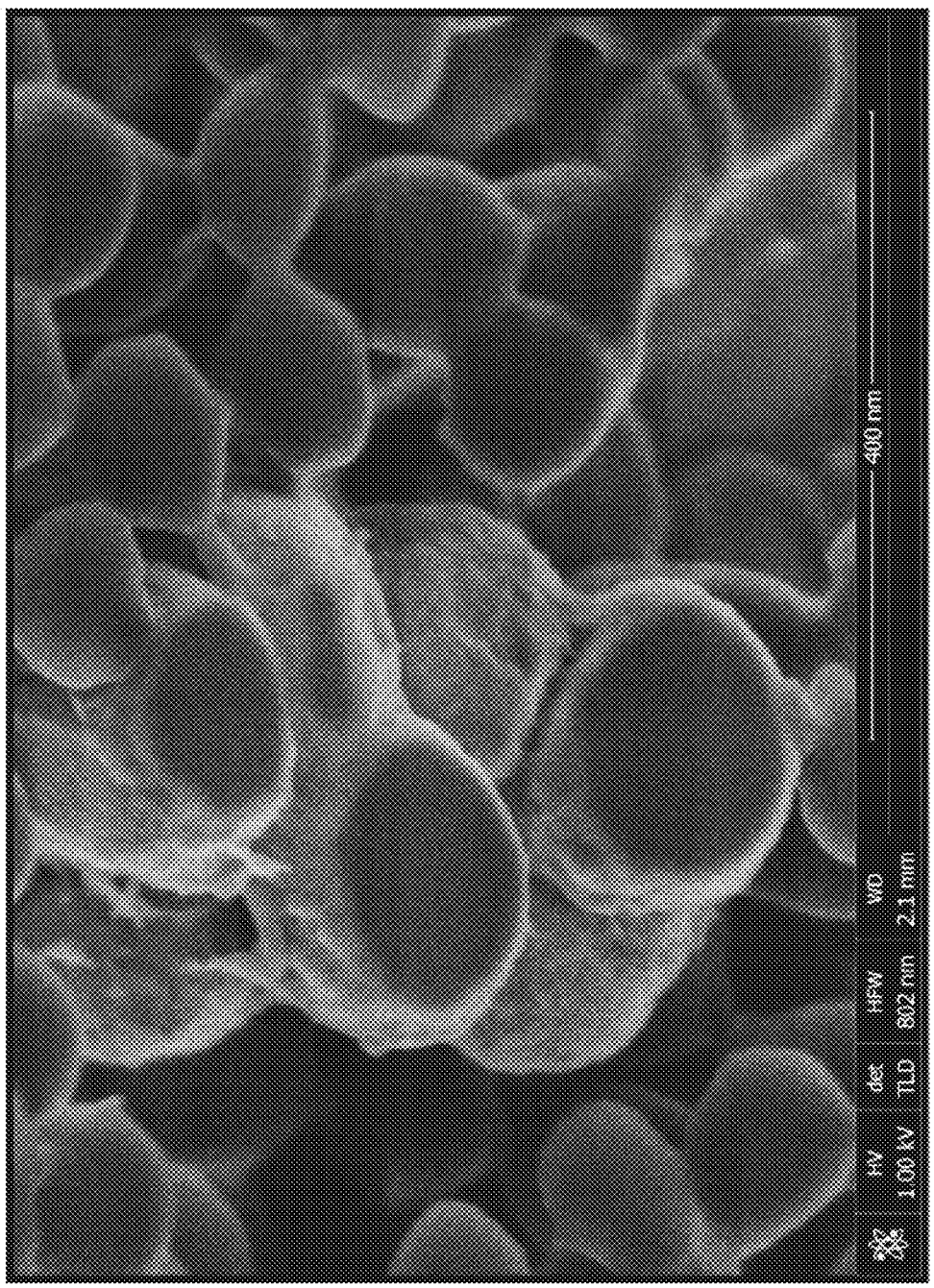
FIG. 14 is a SEM (Scanning Electron Microscope) photograph showing polymer coating details of a particle composition consistent with the present invention.

FIGS. 3-13 are TEM photos of a stanchion-encapsulated titanium dioxide. In particular, in FIG. 7, an area of bridging between stanchions of multiple particles 5 can be seen in the bottom of the photo. Further, in FIG. 11, a single particle 1 coated in a polymeric coating 3 is shown which further includes stanchions 2. That is, in this figure, bubble-like projections extend from the surface of a polymeric coating of a particle, in this example, from the methyl methacrylate coating over a titanium oxide particle. In the SEM photo of FIG. 14 polymer coating details of a single particle are shown.

In the preceding paragraphs, the number and dimension of the stanchions are discussed. The method utilized for determining these characteristics is detailed below.

Method for Determining Number of Stanchions and Stanchion Dimensions

1. Prepare photographic images of sample via TEM or SEM using the procedures and instrumentation described below.
2. Select representative images from the photographs.
3. The images will be two dimensional depictions of the sample
4. Utilizing only those pigment particles that are fully shown in the photograph and are not partially cut off, count the number of stanchions on each particle, keeping a running total of the number of stanchions counted and the number of pigment particles until a statistically significant number of pigment particles and their corresponding stanchions are recorded.
5. Stanchions are identified as those structures that connect two or more pigment particles together or protrude by two times or more of the standard coating thickness.
6. Stanchion dimensions are measured as follows:
    a. Stanchion Length: Draw a line from one pigment particle to the next while dividing the stanchion in half. Measure the distance from the first particle to the second using the scale on the photograph and record the distance. Repeat for all other identified stanchions.

i. Note: If a stanchion is only anchored to a single pigment, then draw a line from the pigment to the tip of the stanchion that divides the stanchion in half. Measure the distance from the pigment particle to the tip of the stanchion using the scale on the photograph and record the distance.
b. Stanchion Width: Draw a line perpendicular to the stanchion length line at the point halfway along the length of the stanchion. Measure the distance across the stanchion using the scale on the photograph and record the distance. Repeat for all other identified stanchions.
7. Using equations 1-1, 1-2 and 1-3 below, calculate the average stanchion length, average stanchion width and average number of stanchions.

Figure 2:
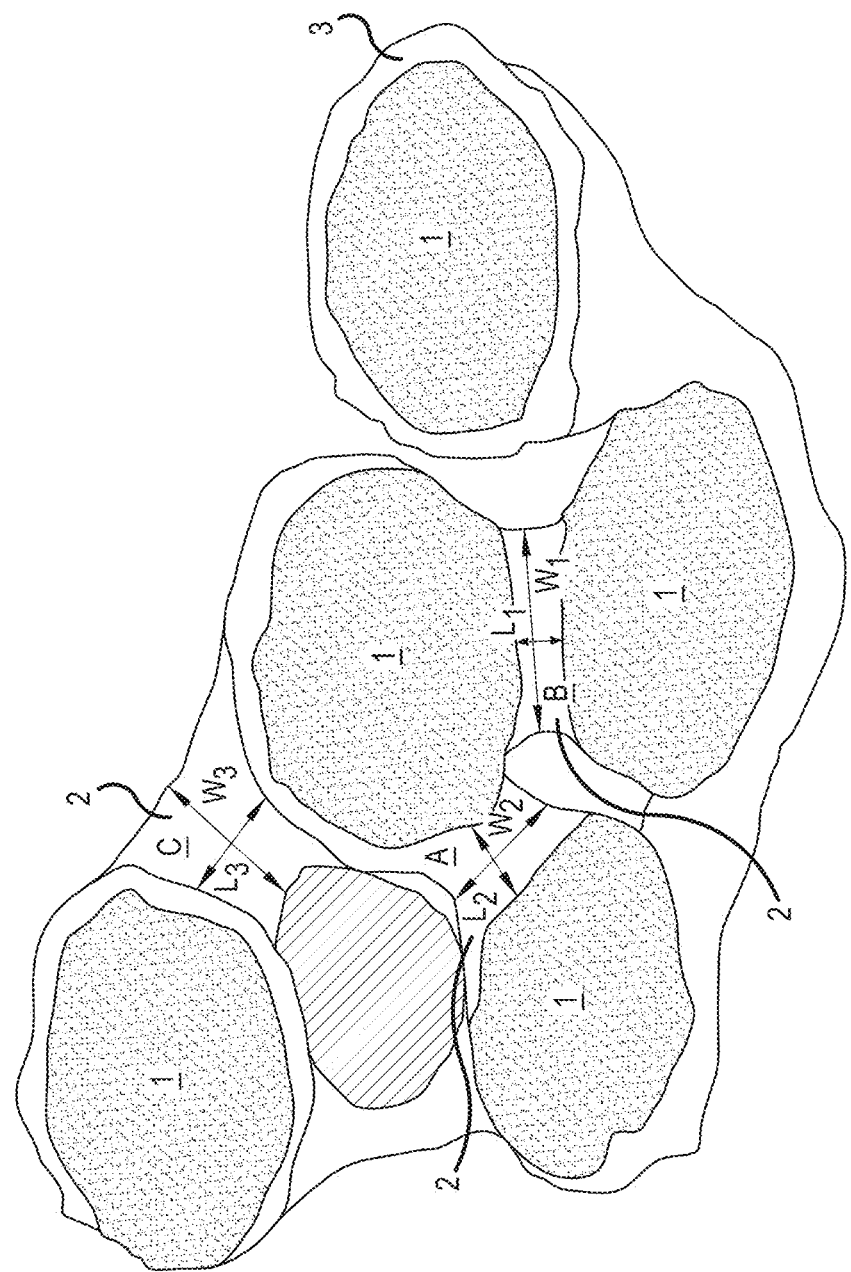
Figure 3:
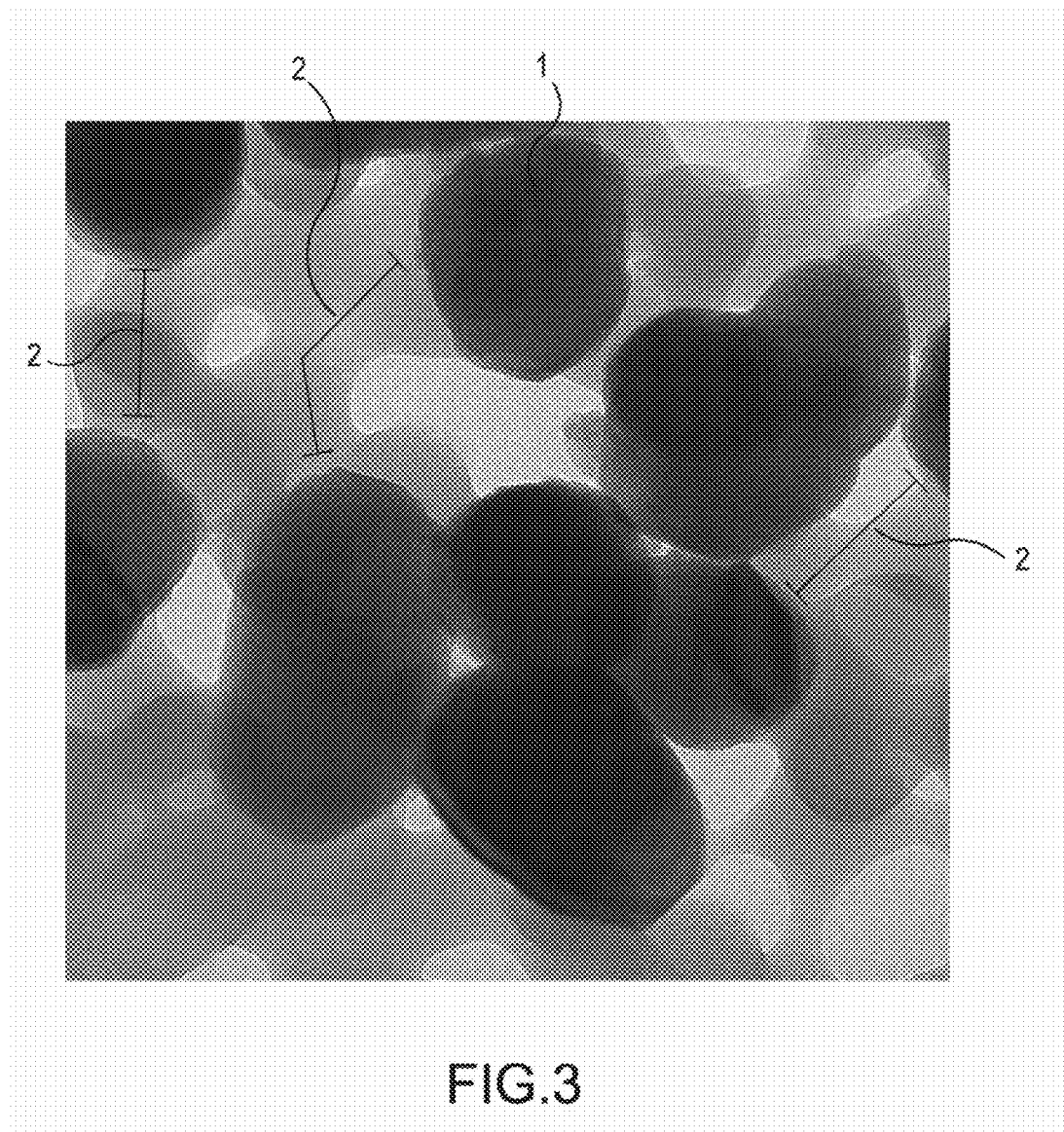
FIGS. 3-13 are TEM (Transmission Electron Microscope) photographs of a particle composition consistent with the present invention.
Figure 4:
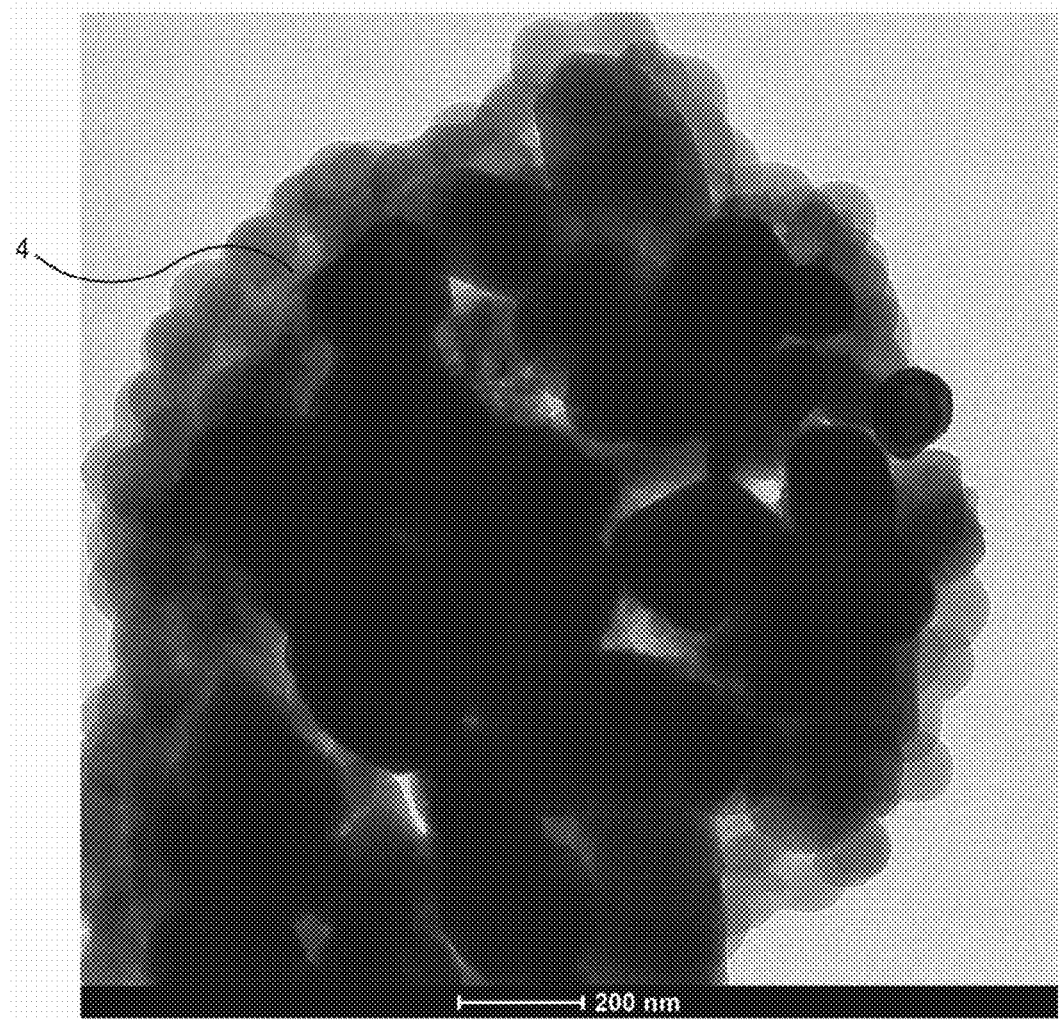
Figure 5:
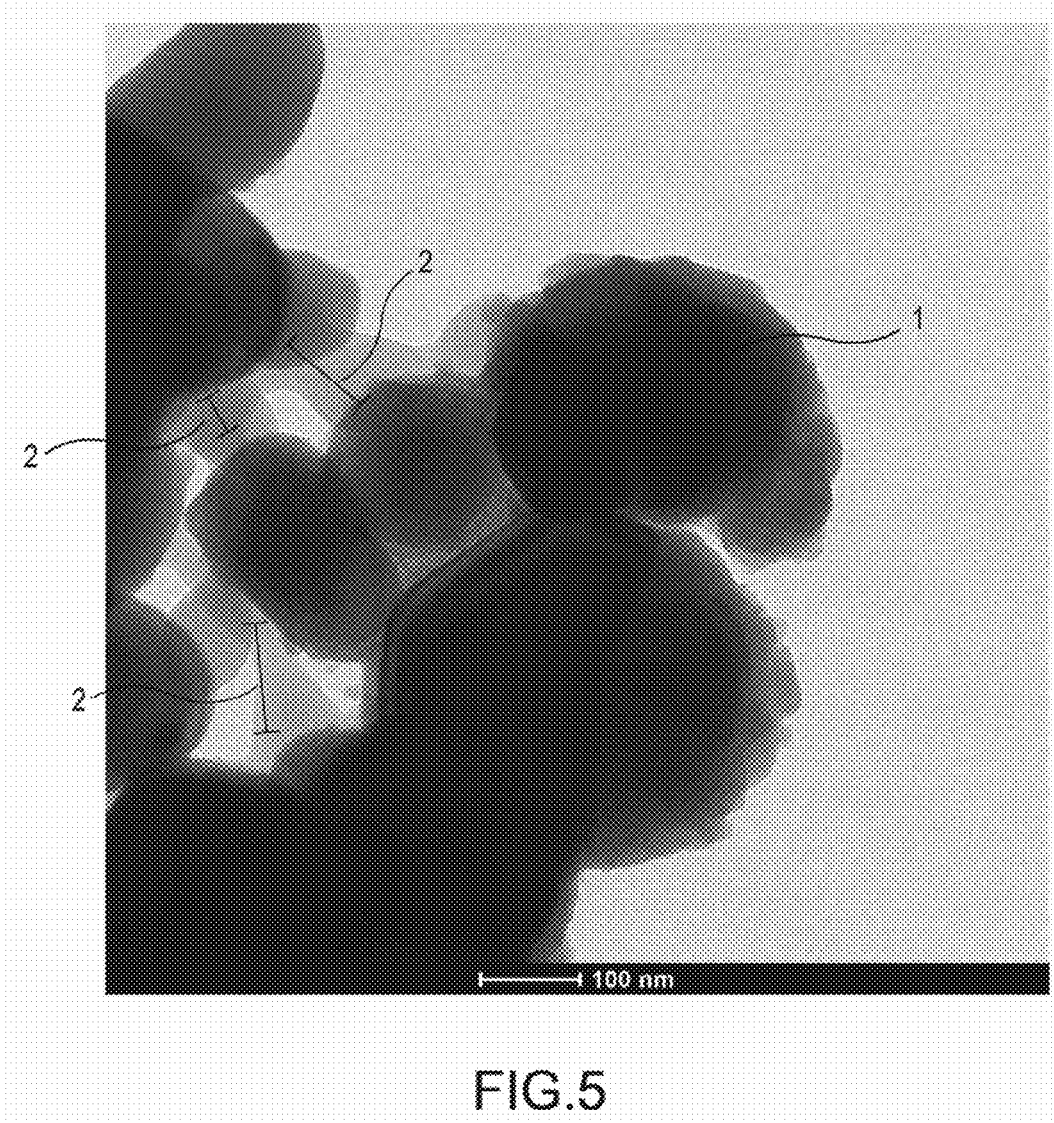
Figure 6:
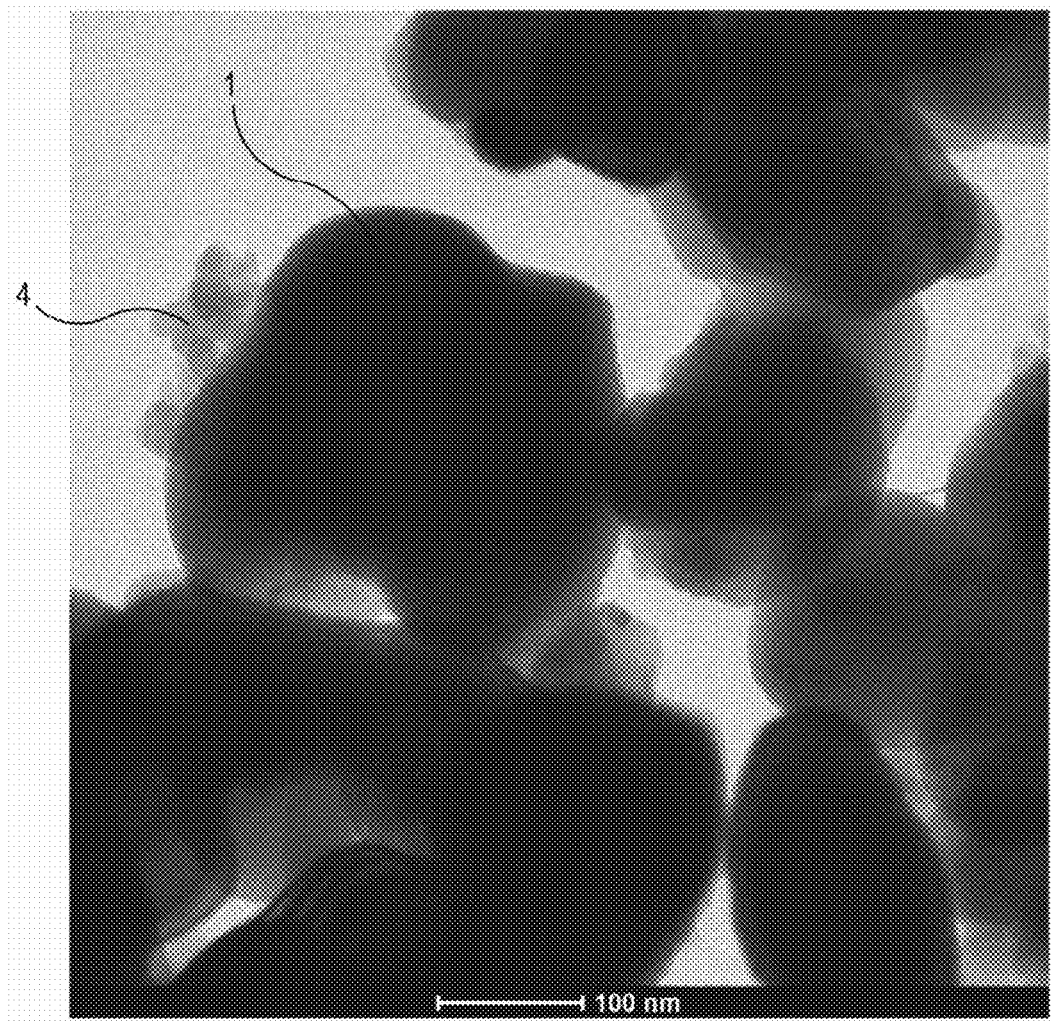
Figure 7:
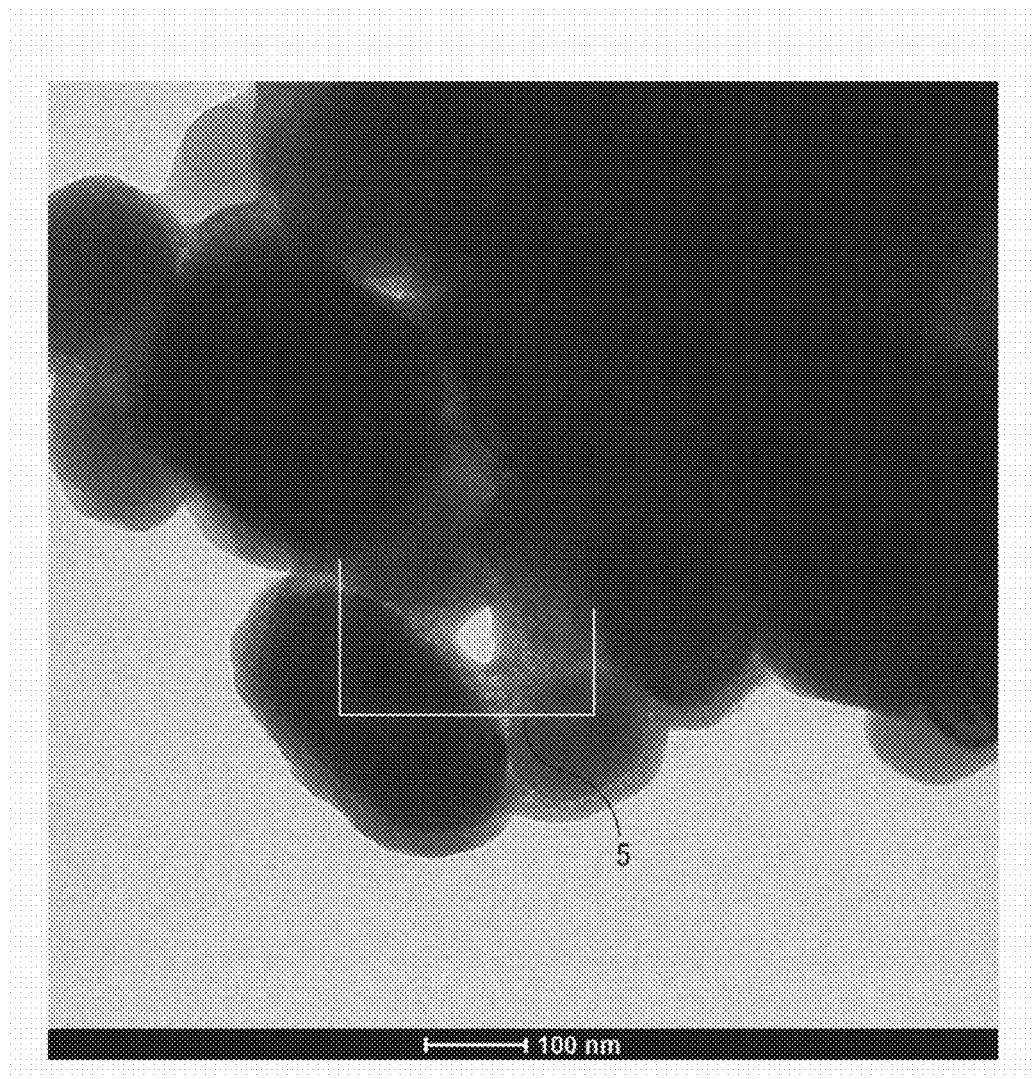
Figure 8:
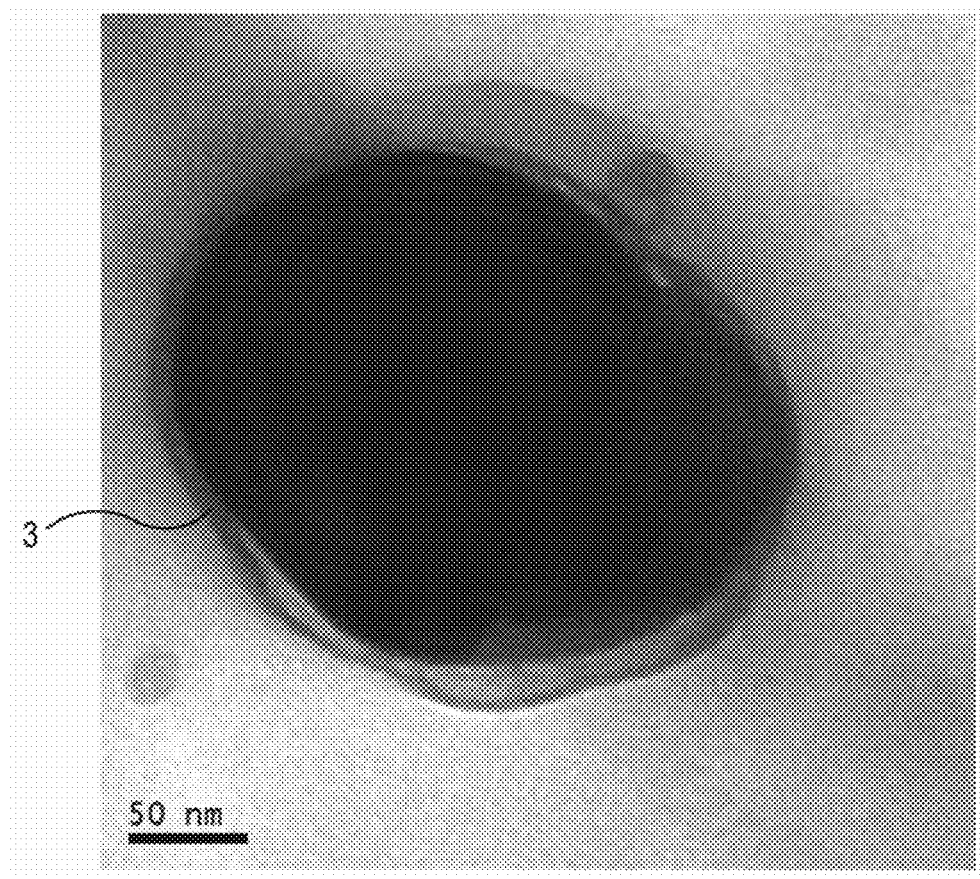
Figure 9:
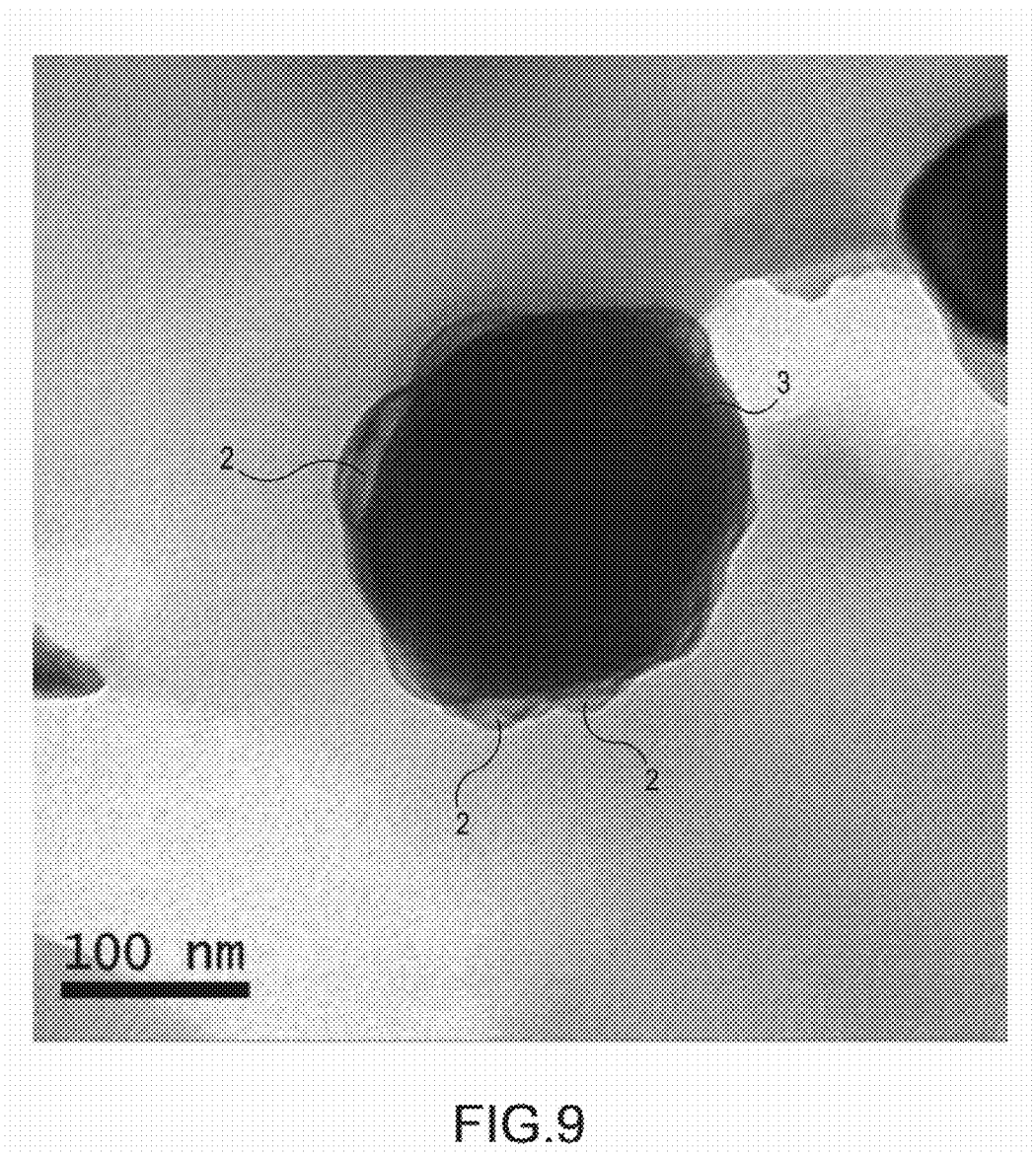
Figure 10:
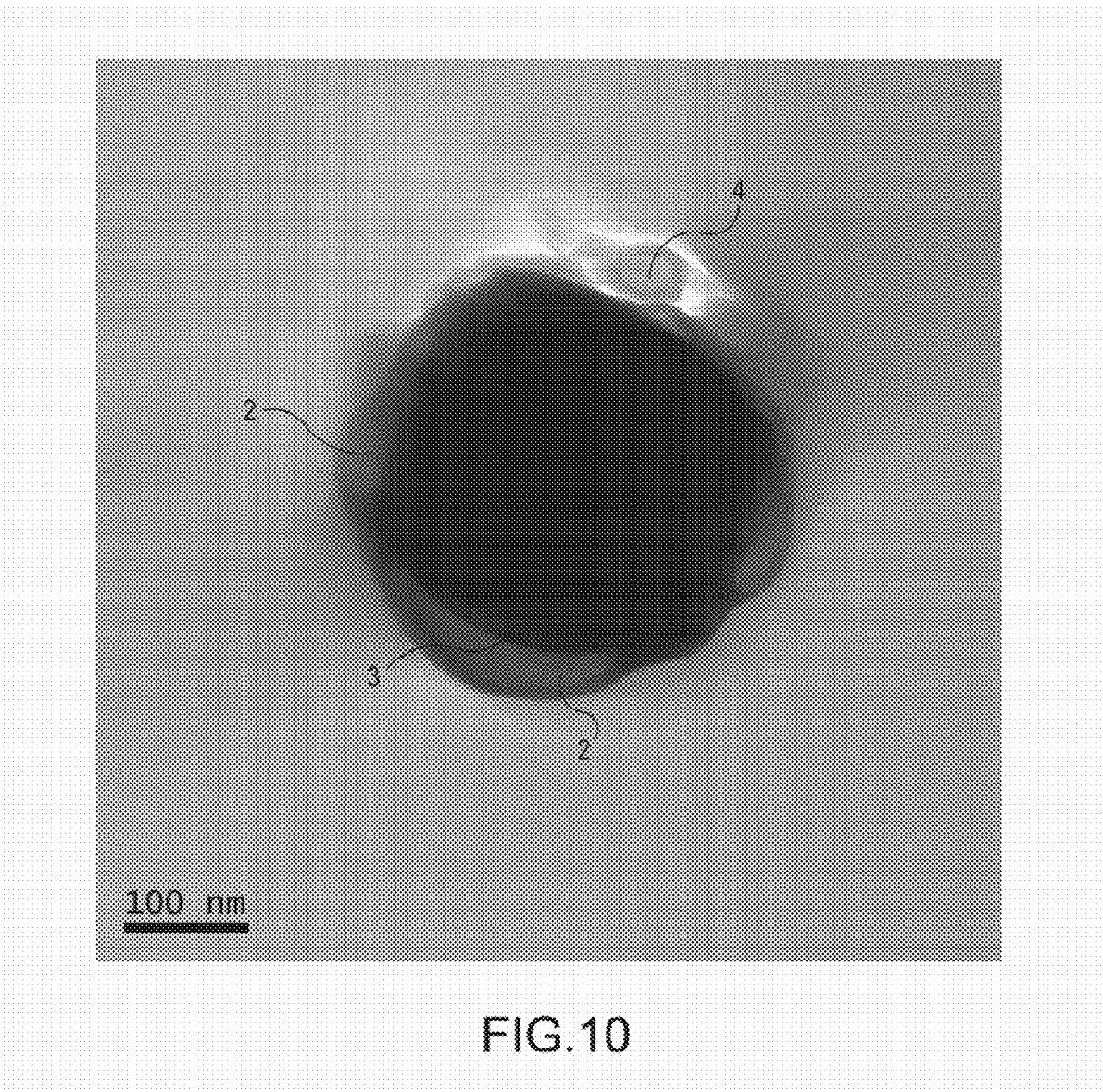
Figure 11:
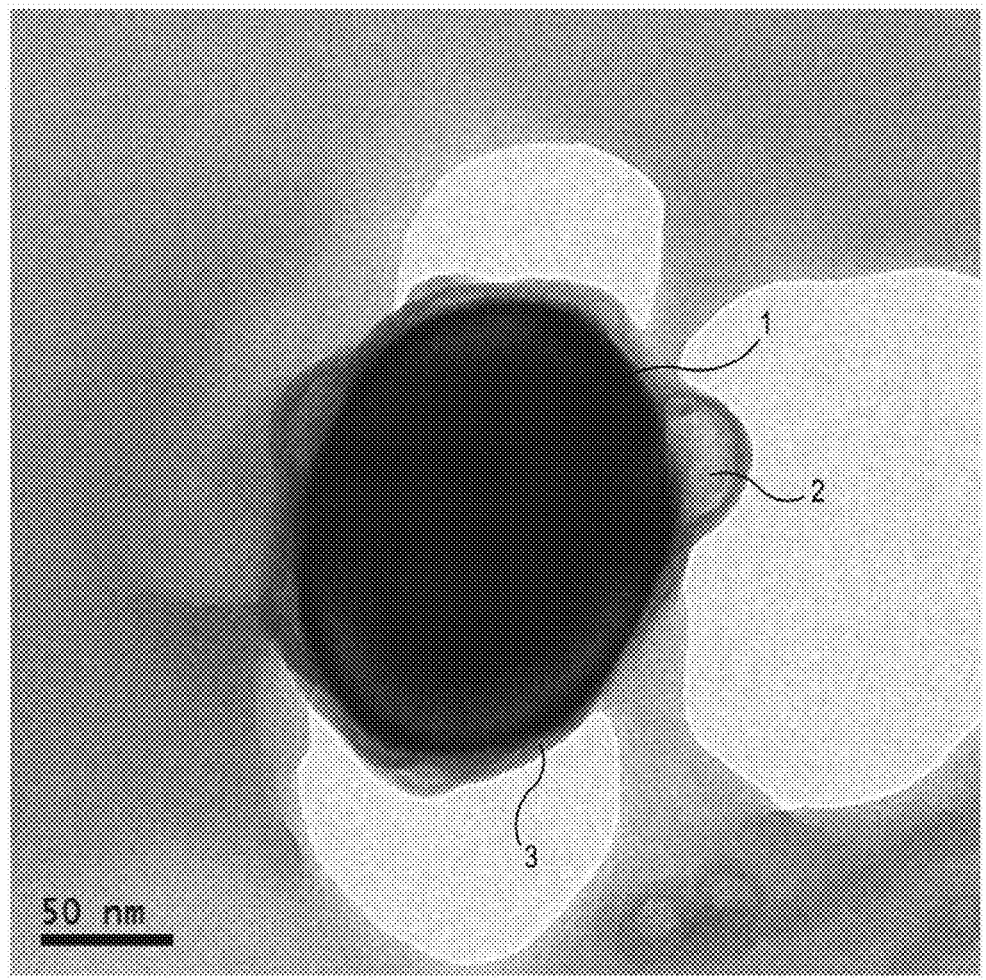
Figure 12:
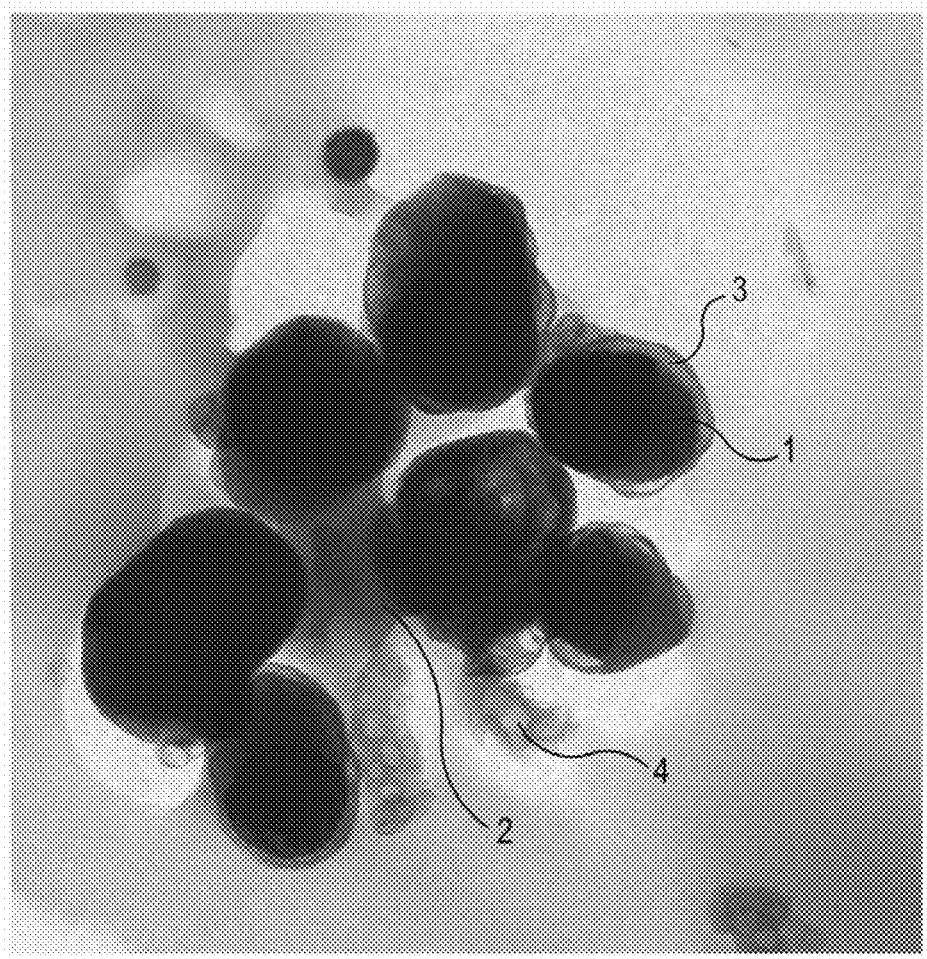
Figure 13:
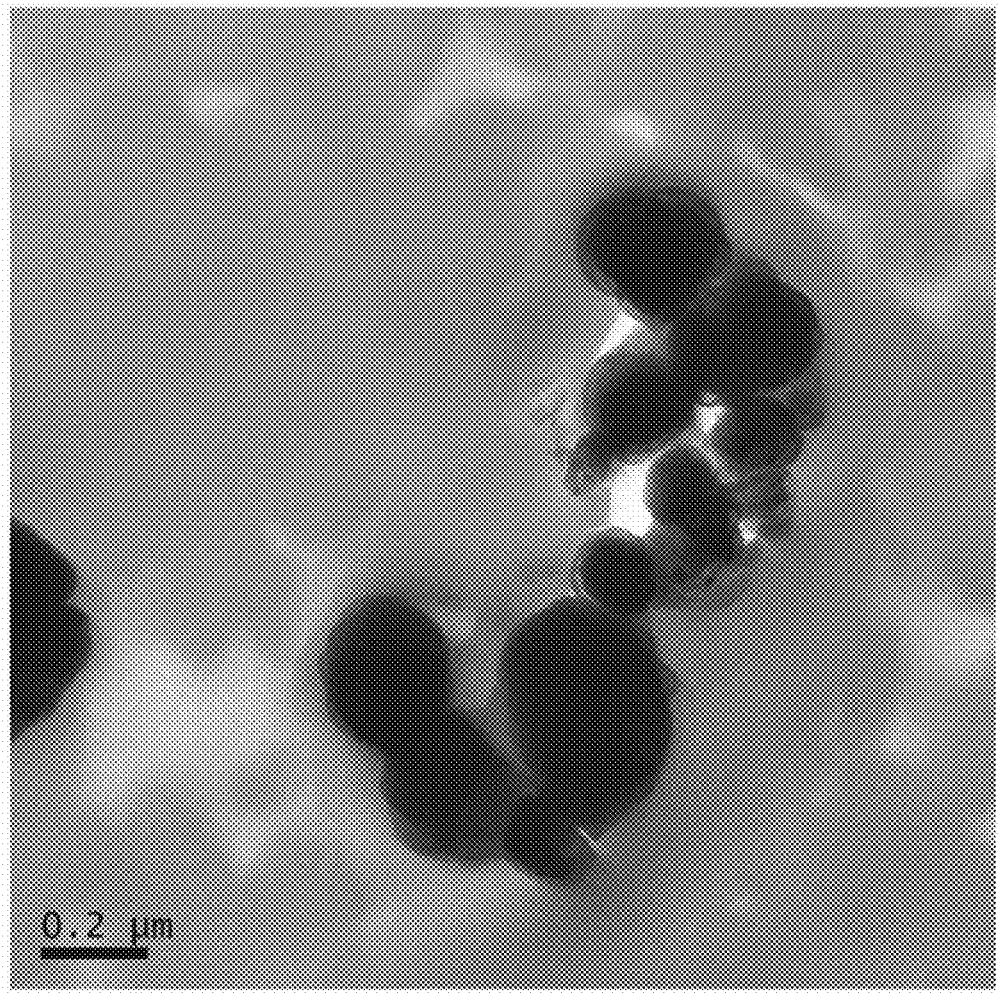

Please refer to FIG. 2 for an indication of examples for the following variables:

l=TiO$_2$ particle
A, B, C=Stanchions
Width (W) and Length (L) are measured microscopically and averaged
Number of stanchions (S) per particle are counted and then averaged $$W_{ave} = \frac{1}{n}\sum_{i=1}^{n} W_i = \frac{W_1 + W_2 + \ldots + W_i}{n} \quad (1\text{-}1)$$

$$L_{ave} = \frac{1}{n}\sum_{i=1}^{n} L_i = \frac{L_1 + L_2 + \ldots + L_i}{n} \quad (1\text{-}2)$$

$$S_{ave} = \frac{1}{n}\sum_{i=1}^{n} S_i = \frac{S_1 + S_2 + \ldots + S_i}{n} \quad (1\text{-}3)$$

Methods for preparing photographic images of sample via TEM and SEM are detailed below.

TEM Test Method

The aqueous TiO$_2$ suspensions were diluted with distilled water and sonicated in a sonicator (Cole-Parmer Model 8890) for 5 minutes. A drop of the solution was put on a 300 mesh Formvar grid and allowed to sit for 5 minutes. The remaining solution was gently blotted away and the grid was allowed to air dry. The sample grids were subsequently examined in bright field mode on an FEI Tecnai Spirit BioTWIN transmission electron microscope operating at 120 kV. Images were collected on an Eagle 2k×2k camera and subsequently converted to tiff format.

An alternative method was to embed the encapsulated TiO$_2$ powders in a resin, for example an acrylic or an epoxy resin, in an embedding mold, and then the sample was cut into ultra-thin sections (40-60 nm thick) using a diamond knife by ultra-microtome (Richelt Ultracut E) after the resin had been cured. The captured sections were place on copper grids, and images were subsequently collected on a Hitachi H-7500 transmission electron microscope.

SEN Test Method

SEM images were collected with a field emission scanning electron microscope (FESEM), for example, Hello Nanolab™ 650 manufactured by FEI Company (5350 NE Dawson Creek Drive, Hillsboro, Oreg. 97124). The sample of aqueous TiO$_2$ suspensions were frozen and prepared in a cryo specimen preparation chamber, and the sample was then milled with focused ion beam (FIB) to reveal the cross section of the sample, polished to remove the rough milling artifacts. Images were then collected after a small amount of water was liberated from the across section, revealing the morphology and structure of the particles.

The titanium dioxide pigment particles used in the stanchion-encapsulation are not particularly limited. A variety of forms including rutile, anatase, brookite, and amorphous are known and are suitable for use in the present invention. Rutile and anatase can be photocatalytic. Titanium dioxide particles can be surface treated with materials such as aluminum oxide, silicon dioxide, tetra ethoxysilane, or zinc oxide. Such surface treatments can be applied to increase dispersibility, uv absorption, or to alter photocatalytic properties.

The titanium dioxide particles are an effective pigment size which can range from 1 nm (nanometer) to 2000 nm, or even to 5000 nm. Typically the uncoated titanium dioxide particles ranges from 1 nm to 2000 nm, more often from 10 nm to 1000 nm, and sometimes from 20 nm to 500 nm.

In general the titanium dioxide particles comprise 30 to 70%, more typically 40 to 60%, and in some cases around 50% (e.g. +/−5), of the total weight of the stanchion-encapsulated titanium dioxide.

The polymeric material used to at least partially surround the pigment particle is not particularly limited and can be made of one or more polymers and optionally with additional ingredients therein. In principle any polymer that can be formed on the pigment particle, optionally with an intervening particle surface coating(s) or treatment(s), can be used. Typically the polymeric material comprises at least one polymer selected from polyacrylate, polymethacrylate, polyalkyl(meth)acrylate, polystyrene, melamine formaldehyde, urea formaldehyde, polyvinyl alcohol, polyvinyl acetate, and combinations thereof. The alkyl group is generally a C1 to C24, but more typically is a C1-C8, or C1-C4 group including straight and branched forms. The polymeric material not only partially or completely surrounds the particle (e.g., as a particle coating or wall material) but also forms the stanchions. Normally the same polymeric material is used to form the coating and the stanchions, but such is not required. For example, the coating or wall polymeric material could be formed on the particles and then one or more monomers could be changed or added to form the stanchions from a different polymeric material.

The stanchion-encapsulated titanium dioxide usually contains from 30 to 70%, often 40 to 60%, and in some embodiments around 50% (e.g. 50%+/−5) by weight of the polymeric material.

The stanchion-encapsulated titanium dioxide results in encapsulated pigment particles having a coated particle size from 1 nm to 7500 nm, more typically from 1 to 5000 nm, more commonly from 3 nm to about 3500 nm, and sometimes from 10 nm to 2500 nm, or even from 10 nm to 2000 nm. Larger particles of a size from 2 microns to 100 microns or from 2 microns to 1000 microns are possible, if the polymeric coated particulates are agglomerated.

A method for determining the median particle size of the coated particles of the present invention is detailed below.

Determination of Median Particle Size

Median particle size is measured using a Zetasizer, made by Malvern Instruments, Ltd, Enigma Business park, Grovewood Road, Malvern, Worcestershire, WR14 1XZ, United Kingdom. Samples for particle size evaluation are prepared by diluting I drop of the encapsulated TiO$_2$ slurry in 1 milliliter of de-ionized water in a cuvette, which is then placed in the sample cell of the instrument. The instrument will display the results, including volume weighted median size.

With reference to FIG. 2, the broadness index can be calculated by determining the particle size at which 95% of the cumulative particle volume is exceeded (95% size), the particle size at which 5% of the cumulative particle volume is exceeded (5% size), and the median volume-weighted particle size (50% size–50% of the particle volume both above and below this size). Broadness Index=((95% size)–(5% size)/50% size).

As noted, the features of the stanchion-encapsulated titanium dioxide contribute to a reduced density of particles in the composition. The encapsulated pigment particle composition has a lower density value as compared to the density value of the unencapsulated pigment. In particular, the stanchion-encapsulated titanium dioxide can have a density of less than 2.72 g/cm$^3$, which is around 34% lower than the nominal density value of un-encapsulated pigment $TiO_2$ material (e.g. 4.23 g/cm$^3$). The density value of the encapsulated particle composition of the invention can be at least 10%, normally at least 20%, typically at least 30%, and sometimes at least 40% lower than the density value of the un-encapsulated pigment material.

The encapsulation process transforms one or more monomeric materials into a polymeric coating on a particle such as titanium dioxide, and also can give rise to stanchioning and one or more macro molecular particle separators. Applicants have surprisingly found that by carefully managing mixing speed range of the coating process and concentration gradient during monomer addition, the size and degree of stanchioning and formation of particle separators 4 can be affected. Optionally, particle separators can be separately added. More efficiently, the separators are optimized to form during the encapsulation process, along with the stanchioning. Optionally, the particle separators and stanchions are the same polymeric materials as the polymeric coating on the particles. However, optionally, each can be formed from a different monomeric material.

During conventional microencapsulation processes, by-products can form. These by-products are residual dense shells or spheroids or particulates of wall material polymers. The particle separators however can be useful by contributing to an increased spacing between the coated particles in the composition. Thus, the stanchions, and particle separators, individually or combined, allow for a reduced density of the coated particles required and lead to higher opacity values when the particle composition is used, for example, in a coating for paper. The quantity of particle separators can be augmented by addition. Particle separators can be obtained by centrifuging and filtration from conventional microencapsulation processes. The present composition and process employ such previously discarded wall balls or form them in-situ as useful particle separators in the present invention.

Discrete particle separators are formed from a polymeric material of the stanchions or coating layer and can be in the form of small spherical structures. The discrete particles separators are formed between the particles of the composition and cause separation of the particles and have a particle size range between 1 nm to 5 um (microns), or even from 1 nm a to 2 um or even from 1 nm to 15 microns or even from 1 nm to 100 microns. A desirable range for the size of the particle separators is from 5 nanometers to 1500 nanometers.

In a yet further embodiment, the discrete particle separators can range in size from 0.01d to about 3.5d or even from 0.01d to about 5 d, where d is the diameter of the polymeric coated particle.

The discrete particle separators contribute to increasing the spacing of the particles. Reduced density of the coated particles and higher opacity values also result from the presence of the particle spacers. In addition, similarly to the stanchions of the present invention, the discrete particle separators contribute to a higher level of brightness.

One way to form stanchion-encapsulated titanium dioxide uses the following steps:
1. Preparing an aqueous solution comprising dispersing agent(s) in a beaker (or vessel);
2. Dispersing solid ($TiO_2$) particles into the above prepared aqueous solution to form a suspension with a mixer;
3. Adjusting pH of the suspension to 9-10, if needed, by the addition of 10% sodium hydroxide solution;
4. Homogenizing the suspension to achieve a good dispersion of the particles in water;
5. Transferring the suspension into a reactor containing additional water;
6. Purging the reactor with nitrogen gas;
7. Adding wall materials into the reactor, which can be monomers and/or oligomers;
8. Adding initiator(s);
9. Raising the temperature in the reactor to initialize the polymerization of the monomers and/or oligomers;
10. Maintaining the temperature and controlling process variables during the polymerization to control wall deposition, and to minimize the agglomeration of the encapsulated particles.

The above process steps are not mandatory and can be varied in many ways as understood by a worker skilled in the art. The dispersing agents can be an organic or an inorganic chemical, or a combination thereof. Typical dispersing agents that can be used include sodium dodecyl sulfate, sodium silicate, sodium polyphosphate, sodium alkyl sulfonate, sodium alkylbenzene sulfonate, sodium alkylnaphthalene sulfonate, polyacrylic acid and its derivatives, polymethacrylic acid and its derivatives, polyethylene oxide and its derivatives, styrene maleic anhydride copolymers.

The particle in water suspension can be prepared by any means, such as a mechanical shear, a homogenizer, a rotorstator mixer, an in-line mixer, a microfluidic mixer, or an ultrasonic device.

Initiators and/or catalysts may be used to initiate the polymerization reaction. Selection of initiators and/or catalysts depends on the wall materials used. For acrylic monomers, sodium persulfate, ammonium persulfate, or redox initiators may be used.

If desired, the charge of the encapsulated particle can be modified. The charge of the encapsulated particle can be altered in zeta potential. The observed zeta potential tends to be positive at low pH and lower or negative at high pH. By selection of emulsifiers, initiators, monomers, or additives in the encapsulation process, the encapsulated particle can be modified to be anionic, nonionic, or cationic.

For example, Schwantes, U.S. Pat. No. 8,067,089 teaches forming cationic charged or neutral micro capsules through use of a cationic or nonionic emulsifiers. Cationic emulsifiers can include amines with primary, secondary or tertiary functionality. Nonionic emulsifiers can include polymers with hydroxyl, ether, ester, ketone and amide functionality.

Cationic emulsifiers can be selected from palmitamidopropyltrimonium chloride, distearyl dimonium chloride, cetyltrimethylammonium chloride, quaternary ammonium compounds, fatty amines, aliphatic ammonium halides, alkyldimethylbenzylammonium halides, alkyldimethylethylammonium halides, polyethyteneimine, poly(2-dimethylamino)ethyl methacrylate)methyl chloride quaternary salt, poly(1-vinylpyrrolidone-co-2-dimethylaminoethyl methacrylate), poly(acrylamide-co-diallyldimethylammonium chloride), poly(allylamine), poly[bis(2-chloroethyl)ether-alt-1,3-bis[3-(dimethylamino)propyl]urea] quaternized, and poly(dimethylamine-co-epichlorohydrin-co-ethylenediamine), and condensation products of aliphatic amines with alkylene oxide.

Cationic emulsifier can include polyalkylenimine compounds wherein the alkylene moieties are from 2 and 8 carbons, and more useful are molecular weights of from 1000 to about 250000. Cationic emulsifiers include palmitamidopropyltrimonium chloride (trademark Varisoft Patch, Evonik Degussa GmbH, Essen, Germany) distearyl dimonium chloride, cetyltrimethylammonium chloride, and polyethyleneimine.

Useful amines can include, by way of illustration and not limitation, amine modified vinyl monomers including amine modified acrylates or methacrylates such as mono or diacrylate amines, mono or dimethacrylate amines, amine modified polyetheracrylates and amine modified polyethermethacrylates, aminoalkyl acrylates or aminoalkyl methacrylate.

The amines can include primary, secondary or tertiary amines and can include tertiary butyl aminethylmethacrylate, diethylaminoethyl methacrylate, or dimethylaminoethyl methacrylate.

Nonionic emulsifier can be selected from polyalkylene glycol ether, condensation products of alkyl phenols, aliphatic alcohols, or fatty acids with alkylene oxide, ethoxylated alkyl phenols, ethoxylated arylphenols, ethoxylated polyaryl phenols, carboxylic esters solubilized with a polyol, polyvinyl alcohol, polyvinyl acetate, or copolymers of polyvinyl alcohol polyvinyl acetate, polyacrylamide, poly(N-isopropylacrylamide), poly(2-hydroxypropyl methacrylate), poly(2-ethyl-2-oxazoline), poly(2-isopropenyl-2-oxazoline-co-meth methacrylate), poly(methyl vinyl ether), and polyvinyl alcohol-co-ethylene).

Suitable emulsifiers can also include amphoteric emulsifiers and zwitterionic emulsifiers.

In some embodiments, it is desirable that the emulsifier is physically or chemically bound or entangled to the external surface of the encapsulated pigment particles. Such physical bindings include, for example, hydrogen bonding, ionic interactions, entanglement, hydrophobic interactions, and electron transfer interactions. Such chemical bindings include, for example, covalent bindings such as covalent grafting and crosslinking. The emulsifier can be added during the process of encapsulation or as a post-treatment after the encapsulate is formed.

The emulsifier is typically present at a level by weight of from about 0.1% to about 40%, from about 0.5% to about 10%, or from about 0.5% to about 5%, by weight of the encapsulated particle. In one embodiment, the polymeric wall material is a polyacrylate or polyalkylacrylate, to which the emulsifier is added during the process of encapsulation, or as a post-treatment.

Anionic emulsifiers can include, by way of illustrating and not limitation, water-soluble salts of alkyl sulfates, alkyl ether sulfates, alkyl isothionates, alkyl carboxylates, alkyl sulfosuccinates, alkyl succinamates, alkyl sulfate salts such as sodium dodecyl sulfate, alkyl sarcosinates, alkyl derivatives of protein hydrolyzates, acyl aspartates, alkyl or alkyl ether or alkylaryl ether phosphate esters, sodium dodecyl sulphate, phospholipids or lecithin, or soaps, sodium, potassium or ammonium stearate, oleate or palmitate, alkylarylsulfonic acid salts such as sodium dodecylbenzenesulfonate, sodium dialkylsulfosuccinates, dioctyl sulfosuccinate, sodium dilaurylsulfosuccinate, poly(styrene sulfonate) sodium salt, isobutylene-maleic anhydride copolymer, gum arabic, sodium alginate, carboxymethylcellulose, cellulose sulfate and pectin, polystyrene sulfonate), isobutylene-maleic anhydride copolymer, gum arabic, carrageenan, sodium alginate, pectic acid, tragacanth gum, almond gum and agar; semi-synthetic polymers such as carboxymethyl cellulose, sulfated cellulose, sulfated methylcellulose, carboxymethyl starch, phosphated starch, lignin sulfonic acid; and synthetic polymers such as maleic anhydride copolymers (including hydrolyzates thereof), polyacrylic acid, polymethacrylic acid, acrylic acid butyl acrylate copolymer or crotonic acid homopolymers and copolymers, vinylbenzenesulfonic acid or 2-acrylamido-2-methylpropanesulfonic acid homopolymers and copolymers, and partial amide or partial ester of such polymers and copolymers, carboxymodified polyvinyl alcohol, sulfonic acid-modified polyvinyl alcohol and phosphoric acid-modified polyvinyl alcohol, phosphated or sulfated tristyrylphenol ethoxylates.

In an alternate embodiment, it is useful to use anionic emulsifiers that have acrylate functionality since these can be covalently linked to the shell or wall portion of the polymeric coating encapsulating the pigment particles, particularly when the polymeric material encapsulating the solid particles is polyacrylate or an alkyl acrylate acrylic acid copolymer. During the process of encapsulating the pigment particles, emulsifiers can be included. Anionic emulsifiers can include, but are not limited to poly(meth) acrylic acid; copolymers of (meth)acrylic acids and its (meth)acrylates with C1-C26 alkyl, C1-C22 alkyl, such as butyl, copolymers of (meth)acrylic acids and (meth)acrylamide; carboxyvinylpolymer, acrylate copolymers such as acrylate/C10-30 alkyl acrylate crosspolymer, acrylic acid/ vinyl ester copolymer/acrylates/vinyl Isodecanoate crosspolymer, acrylates trademarks Palmeth-25 acrylate copolymer, Acrylate/Steareth-20 Itaconate copolymer, and Acrylate/Celeth-20 Itaconate copolymer, polystyrene sulphonate, copolymers of methacrylic acid and acrylamidomethylpropane sulfonic acid, and copolymers of acrylic acid and acrylamidomethylpropane sulfonic acid, carboxymethycellulose; carboxy guar, copolymers of ethylene and maleic acid, and acrylate silicone polymer. In some embodiments, if desired, neutralizing agents may be included to neutralize the anionic emulsifiers herein. Non-limiting examples of such neutralizing agents include sodium hydroxide, potassium hydroxide, ammonium hydroxide, monoethanolamine, diethanolamine, triethanolamine, diisopropanolamine, aminomethylpropanol, tromethamine, tetrahydroxypropyl ethylenediamine, and mixtures thereof. Commercially available anionic emulsifiers include, for example, Carbomer supplied from Noveon under the trademark Carbopol 981 and Carbopol 980, acrylatesC10-30 alkyl acrylate copolymers sold under name Pemulen TR-1, Pemulen TR-2, Carbopol 1342, Carbopol 1382, and Carbopol ETD 2020, such as available from Noveon, sodium carboxymethylcellulose (Hercules CMC series), and acrylate copolymer (trademark Capigel from Seppic).

Optionally, the pigment may be coated, such as with a cationic polymer. In a sense, the encapsulated pigment particle can be considered a microcapsule. With anionic polymeric wall material encapsulating the solid particle, the cationic polymer allows partial or complete neutralization of the negative electrical charge borne by the encapsulated solid particles, or microcapsule wall material, or even the conversion of the negatively-charged encapsulated particles into positively-charged encapsulated particles.

In one embodiment, useful cationic polymers can comprise cationic cellulose derivatives, such as those available under the trademark Ucare, and quaternized gums, such as quaternized guar gums available under the trademark Jaguar (Rhodia), polyethylene imine, such as those available commercially under the trademark Lupasol (BASF), cationic polyacrylates and acrylamides, gelatine and quaternized protein hydrolysates, and quaternized amino silicones.

Other cationic compounds that can be used include the polyquaternium materials which have a plurality of quaternary ammonium groups, polymeric species such as diallyl dimethyl ammonium chloride/acrylamide polymers, for example, those available under the trademark Merquat (Nalco), and copolymers of vinyl pyrrolidone and quaternized dimethylaminoalkyl methacrylate, for example, those available under the trademark Gafquat HS 50 and HS 100 (ISP).

Optionally, the surface properties of the encapsulated particles can be altered by incorporating different monomers and/or oligomers with desired functionalities. Examples of monomers with carboxylic groups include acylic acid, methacrylic acid, crotonic acid, 2-ethylacrylic acid, 2-pentenic acid, 4-pentenic acid, 2-propylacrylic acid, 2-octenoic acid, 3-vinylbenzoic acid, 4-vinylbenzoic acid, trans-3-benzoylacrylic (4-oxo-4-phenyl-2-butenoic) acid, 2-bromoacrylic acid, 2-bromomethyl-acrylic acid, 10-undecenoic acid, palmitoleinic acid, fumaric acid, and maleic acid.

Examples of monomers with amino groups include methacrylamide, N-methyl methacrylamide, N-(2-methacryloyloxyethyl)ethyleneurea, and 3-dimethylaminopropyl)methacrylamide.

Optionally, the surface properties of the encapsulated particles can be altered by using different initiators with desired functionalities. Examples of initiators include 4,4'-azobis(4-cyanovaleric acid), 2,2'-azobis(2-methylpropionamidine)dihydrochloride, 2,2'-azobis[2-(2-imidazolin-2-yl)propane]dihydrochloride, 2,2'-azobis[2-(2-imidazolin-2-yl)propane]disulfate dehydrate, 2,2'-azobis[N-(2-carboxyethyl)-2-methylpropionamidine]hydrate, 2,2'-azobis[2-(2-imidazolin-2-yl)propane], 2,2'-azobis(1-imino-1-pyrrolidino-2-ethylpropane)dihydrochloride, and 2,2'-azobis[2-methyl-N-(2-hydroxyethyl)propionamide.

The coating on the base paper contains the binder and stanchion-encapsulated titanium dioxide as described above, and may contain additional ingredients. The amount of the stanchion-encapsulated titanium dioxide is not particularly limited and is generally within the range of 1 to 60%, more typically from 1 to 45%, and often 1 to 30%, by weight, of the coating. Often the weight of the encapsulated pigment in terms of titanium dioxide is a convenient measure. For example, if 50% of the weight of the stanchion-encapsulated titanium dioxide was due to the weight of the titanium dioxide pigment particles (the remainder to the polymeric material), then 5 mg of the stanchion-encapsulated titanium dioxide has an equivalent $TiO_2$ content of 2.5 mg; i.e., only 2.5 mg of $TiO_2$ are present in the 5 mg of the encapsulate in this hypothetical. The amount of the dispersion in terms of titanium dioxide is often within the range of 1 to 50%, more likely 2 to 20%, and sometimes 2.5%, 5%, 7.5%, 10%, or 15%. In some embodiments the stanchion-encapsulated titanium dioxide provides $TiO_2$ in an amount of 1 to 10%, by weight based on the total weight of the coating.

Owing to the use of the stanchion-encapsulated titanium dioxide, the brightness, opacity, and/or gloss achieved by conventional titanium dioxide can be achieved with a lower effective amount of $TiO_2$. Typically 75% or less of the equivalent amount of titanium dioxide is needed and in preferred embodiments about half as much. Accordingly, preferred coated papers of the present invention have a brightness that is at least 99.7% the brightness of a comparative coated paper that is otherwise identical in composition and formation but which replaces the stanchion-encapsulated titanium dioxide with non-encapsulated titanium dioxide and which uses twice the amount of titanium dioxide in comparison to the amount of titanium dioxide provided by the stanchion-encapsulated titanium dioxide. In some embodiments the brightness is at least 99.8%, and even at least 99.9%. In some embodiments the brightness is superior.

The coated paper according to the invention using stanchion encapsulated titanium dioxide has an opacity equivalent to or better as compared to a coated paper using a substantially equivalent but non-encapsulated titanium dioxide, but the coated paper according to the invention using 75% or less of stanchion-encapsulated pigment. Further, with the coated paper according to the invention, with stanchion encapsulated titanium dioxide, equivalent or better gloss is achieved but using 75% or less of the stanchion encapsulated pigment as compared to a coated paper using a substantially equivalent non-encapsulated titanium dioxide. Additionally, in the coated paper according to the invention, equivalent or higher gloss is achieved using lower calendar pressure with the paper using stanchion encapsulated pigment as compared to a coated paper using non-encapsulated titanium dioxide. In one embodiment, the coated paper according to the invention, wherein the pigment is a rutile titanium dioxide, the paper was found to have an Einlehner Abrasion of less than 10 mg. The coated paper according to the invention using stanchion encapsulated titanium dioxide has an Einlehner abrasion value at least 50% less when compared to the Einlehner value of a coated paper using an equivalent amount of the same titanium dioxide which is non-encapsulated. Moreover, the coated paper using stanchion-encapsulated titanium dioxide has a Sheffield Smoothness equivalent to or better than coated paper using two times (2×) by weight of a substantially equivalent non-encapsulated titanium dioxide.

Alternatively, the stanchion encapsulated pigment can comprise a filler for paper. The paper comprises cellulose pulp and filler wherein the filler comprises a stanchion-encapsulated pigment. In one such embodiment the pigment is titanium dioxide. Such paper at a loading level of 50% by weight or less of stanchion-encapsulated titanium dioxide as compared to a paper using non-encapsulated titanium dioxide has an opacity which is equivalent or higher than the paper using a non-encapsulated titanium dioxide. Also paper according to the invention using stanchion-encapsulated titanium dioxide at an equivalent loading level or less, as a filler has a higher brightness as compared to a paper filled using the same or similar titanium dioxide which is non-encapsulated.

The coated paper coating may contain additives such as other pigments (calcium carbonate, clays such as kaolin), surfactants, dispersants, lubricants, thickeners, anti-foaming agents, opacifying agents, and optical brightening agents. The additional pigments may be used in small or large amounts. Generally the other additives are used in small amounts, e.g., 0 to 10%, often 1 to 5%.

The coated paper can be made using known techniques. In general a paper coating mixture is formed that contains water, the binder, and the stanchion-encapsulated titanium dioxide or other pigment, and optionally any additional pigments, particle separators, and additives. The mixture is generally, though not necessarily, a suspension of the solid stanchion-encapsulated titanium dioxide or pigment. The binder may be dissolved, gelled and/or swollen or dispersed in the water. The additional ingredients, if any, may be dissolved or suspended or both. The paper coating mixture is formed by combining the paper coating ingredients into water, optionally with a surfactant or dispersant. Preferably the solids are dispersed by mixing and the preferably stable aqueous dispersion is coated onto or into the base paper. Depending on substrate porosity, some of the coating is absorbed into the paper substrate. The application can be by spraying, blade coating, rod, air knife, slot die, gravure, flexographic, rotogravure, reverse roll coating, flood coating, slide coating, curtain coating, spraying, brushing or any other suitable coating technique or alternatively could be incorporated as a fill, such as into the wet end of a Fourdrinier paper machine thereby incorporated into the paper during paper formation. Further information on coating methods is disclosed in Modern Coating and Drying, Edward Cohen and Edgar Gutoff 1992 VCH Publishers, Inc. Subsequent drying removes the water and forms the coating on the paper or in the paper as a fill.

After coating the base paper, the coated paper may be subject to calendaring. The calendaring process improves gloss but usually at the expense of opacity. In preferred embodiments of the present invention, the more efficient brightening and gloss achieved by the stanchion-encapsulated titanium dioxide can permit calendaring to be avoided or to be undertaken with less severe conditions.

The invention will now be described with reference to the following non-limiting examples. All measurements are by weight and in the metric system unless otherwise noted.

EXAMPLES

Example 1

Stanchion Encapsulation of Titanium Dioxide from a Pre-Dispersed TiO2 Slurry

To a reactor was added 621 grams of de-ionized water, followed by 0.19 g of sodium dodecyl sulfate under slow agitation with a three blade propeller. After mixed for 10 min., 127.6 grams of pre-dispersed Ti-Pure RPS Vantage TiO2 slurry from Dupont was transferred into this reactor. The reactor was then purged with nitrogen at a flow rate of 300 ml/min. To the reactor was added 91.3 g of methyl methacrylate, followed by 0.9 grams of potassium persulfate, both available from Sigma Aldrich. The reactor temperature was ramped from room temperature to 65° C. over 90 minutes at a rate of 0.44° C./min, and then was held at 65° C. for 8 hours. The agitation speed was controlled at 300 rpm with a propeller during this period. The content of the reactor was then cooled to room temperature at a rate of 1° C. per minute, and is to be used for formulating a paper coating, or for other applications.

Example 2

Stanchion Encapsulation of Titanium Dioxide from Dry Powders

Preparation of $TiO_2$ suspension: To a pre-dispersion reactor was added 159 grains of de-ionized water at room temperature, followed by addition of 0.9 grams of sodium polyphosphate under agitation. After mixed for 10 min, 91.3 grams of titanium dioxide powder (Ti-Pure R796±, available from DuPont) was added to the reactor with continued agitation. The pH of the suspension was adjusted to 9.6 with 10% sodium hydroxide solution. The suspension was then homogenized at 10,000 rpm with a homogenizer from Polytron for 3 min, and the $TiO_2$ particle size was then analyzed with a Malvern Zetasizer available from Malvern Instruments Ltd., Enigma Business Park, Grovewood Road, Worcestershire, WR14 1XZ, United Kingdom.

Encapsulation: To a reactor was added 498 grams of De-ionized water, followed by 0.19 grams of sodium dodecyl sulfate (SDS, available from Sigma Aldrich) under agitation with a three blade propeller. After mixing for 10 minutes, the $TiO_2$ suspension prepared above was transferred into this reactor. The reactor was then purged with nitrogen at a flow rate of 300 ml/min. To the reactor was added 91.3 grams of methyl methacrylate (MMA), followed by 0.9 grams of potassium persulfate (KPS), both available from Sigma Aldrich. The reactor temperature was ramped from room temperature to 65° C. over 90 minutes at a rate of 0.44° C./min, and then was held at 65° C. for 8 hours to complete. The agitation speed was controlled at 275 rpm during this reaction period. The content of the reactor was then cooled to room temperature at a rate of 1° C. per minute.

Example 3

Coated Paper Using Encapsulated $TiO_2$ of Example 1

The coating mixture was prepared according to formula in Table 1 with encapsulated $TiO_2$ from Example 1. The mixture was thoroughly mixed with a stirrer, and was then coated on a Domtar 34# base paper with a coating rod. The coated paper was ready for testing after it has been dried.

TABLE 1

Coating formula with binders

| TiO2 Slurry | Control | RPS Vantage (trademark of DuPont) | | | | Ex. 3 Encapsulated $TiO_2$ | | | |
| --- | --- | --- | --- | --- | --- | --- | --- | --- | --- |
| TiO2% | 0% | 5 | 10 | 20 | 40 | 2.5 | 5 | 10 | 20 |
| Latex XU31056 | 12.26 | 11.70 | 11.04 | 9.82 | 7.37 | 8.84 | 7.87 | 5.92 | 1.96 |
| Rhoplex E2961 | 1.05 | 1.00 | 0.95 | 0.84 | 0.63 | 0.76 | 0.67 | 0.51 | 0.17 |
| TiO2 Slurry | 0.00 | 0.44 | 0.87 | 1.75 | 3.50 | 2.34 | 4.68 | 9.37 | 18.64 |
| Deionized Water | 11.69 | 11.86 | 12.14 | 12.59 | 13.50 | 13.06 | 11.78 | 9.20 | 4.23 |

The abbreviations correspond to the following materials:

| Chemical Name | Company/City | Chemical |
| --- | --- | --- |
| RPS Vantage | Dupont, Wilmington, Delaware | Rutile titanium dioxide |
| Latex XU31056 | Dow Chemical Company, Midland, MI | Styrene-butadiene based polymer |
| Rhoplex E2961 | Dow Chemical Company, Midland, MI | Ammonium salt of acrylic polymer |

Example 4

Coated Paper Using a Coated Free Sheet Formula

A coating mixture was prepared according to the formula in Table 2 based on encapsulated TiO2 from Example 1. The mixture was thoroughly mixed with a stirrer, and was then coated on a. Domtar 34# base paper with a coating rod. The coated paper was tested following drying,

TABLE 2

Coated free sheet formula.

| TiO2 Slurry | Control | RPS Vantage (trademark of DuPont) | | | Ex. 4 | Encapsulated TiO$_2$ | |
|---|---|---|---|---|---|---|---|
| TiO2% | 0 | 5 | 10 | 20 | 5 | 10 | 20 |
| Hydrocarb 90 | 4.14 | 5.29 | 5.29 | 5.29 | 5.29 | 5.29 | 5.29 |
| Ultrawhite 90 | 5.18 | 6.47 | 6.47 | 6.47 | 6.47 | 6.47 | 6.47 |
| TiO2 | 0.00 | 0.74 | 1.56 | 3.52 | 2.68 | 5.66 | 12.73 |
| Dispex N40 | 0.04 | 0.05 | 0.05 | 0.05 | 0.05 | 0.05 | 0.05 |
| Foam master VF | 0.01 | 0.01 | 0.01 | 0.01 | 0.01 | 0.01 | 0.01 |
| Finnfix 5 G | 0.04 | 0.05 | 0.05 | 0.05 | 0.05 | 0.05 | 0.05 |
| Ropaque TH-1000 | 1.45 | 1.81 | 1.81 | 1.81 | 1.81 | 1.81 | 1.81 |
| Nopcote C104 | 0.15 | 0.19 | 0.19 | 0.19 | 0.19 | 0.19 | 0.19 |
| Airvol 103 | 0.16 | 0.20 | 0.20 | 0.20 | 0.20 | 0.20 | 0.20 |
| Styrene-butadiene based polymer | 1.42 | 1.78 | 1.78 | 1.78 | 1.78 | 1.78 | 1.78 |
| Deionized Water | 20.42 | 24.5 | 25.79 | 28.87 | 20.74 | 17.83 | 10.83 |

The abbreviations correspond to the following materials:

| Chemical Name | Company/City | Chemical |
|---|---|---|
| RPS Vantage | Dupont, Wilmington, Delaware | Rutile titanium dioxide |
| Hydrocarb 90 | Omya, Cincinnati, OH | Calcium Carbonate (Limestone) |
| Ultrawhite 90 | BASF, Florham Park, NJ | Hydrous Aluminum Silicate |
| Dispex N40 | Ciba Specialty Chemicals Corporation, Suffolk, VA | 2-Propenoic acid, homopolymer, sodium salt |
| Foamaster VF | Cognis Corporation, Cincinnati, OH | Petroleum Derivative and Other Additives |
| Finnfix 5 G | CP KELCO, Atlanta, Georgia | Sodium Carboxymethyl cellulose |
| Ropaque TH-1000 | Dow Chemicla Company, Midland, MI | Styrene/acrylic copolymer |
| Nopcote C104 | GEO SPECIALTY CHEMICALS, INC., Harrison, NJ | Fatty acids, C14-18 and C16-18 unsaturated, calcium salts |
| Airvol 103 | Air Products and Chemicals, Allenton, PA | Polyvinyl alcohol |
| Styrene-butadiene based polymer | Styron LLC, Berwyn, PA | Styrene-butadiene based polymer |

Example 5

Test of Opacity of Coated Papers

The opacity of the coated papers from Examples 3 and 4 was measured with an opacimeter (Model BNL-3, manufactured by Technidyne Corporation, New Albany, Ind.). Comparison of opacity of paper coating according to the invention with conventional titanium dioxide coating is presented in FIGS. 15 and 16.

Example 6

Test of Brightness of the Coated Paper

The brightness of the coated paper from Example 3 was measured with a Color Touch 2, Model ISO, manufactured by Technidyne Corporation, New Albany, Ind. Comparison of brightness (UV excluded) of paper coating according to the invention with conventional titanium dioxide coating is presented in FIG. 17.

Example 7

Test of Einlehner Abrasion

Abrasion resistance was measured according to the Einlehner Abrasion Testing of Pigment. The procedure of the Einlehner AT-1000 (bronze) as follows:

Experimental

Einlehner AT-1000 (bronze). A cleaned, pre-weighed phosphorbronze test screen supplied by Hans Einlehner, Inc. is clamped to the bottom of the test cylinder. The test slurry, prepared by thoroughly mixing 100.0 g pigment (dry basis) with 978.0 g H2O, is poured into the test cylinder. The testing body is fitted with PVC hose sections supplied by Hans Einlehner, Inc. and placed in its proper position in the test cylinder. After 174000 spindle rotations, the experiment is stopped. The test screen is washed, dried and weighed. The weight loss (in mg) suffered by the test screen yields the Einlehner value.

As shown in FIG. 18, the encapsulated TiO2 particles yielded less abrasive values in the Einlehner test than a control sample, a commercial rutile TiO$_2$, RPS Vantage.

Example 8

Test of Gloss of Paper Coating

The Gloss at 75 degree of the coated paper from Example 4 was tested with Technidyne Model T48, according to TAPPI Test Method T480. Comparison of opacity of paper coating according to the invention with conventional titanium dioxide coating is presented in FIG. 19.

Example 9

Test of Gloss of Coated Paper at Different Calendar Pressures

The coated paper from Example 4 was run through a calendar (Beloit Wheeler Corporation, Kalamazoo, Mich.) at a pressure at 1000, 2000 and 3000 PSI, respectively, and the Gloss at 75 degree of the calendared paper was tested with Technidyne Model T48, according to TAPPI Test Method T480. Comparison of the gloss of the paper coated according to the invention was made as compared to a paper with a conventional titanium dioxide coating. Results are presented in FIG. 20.

Example 10

Test of Sheffield Smoothness of the Coated Aper

The Sheffield Smoothness of the coated paper from example 4 was tested with Hagerty Technologies Model 538, according to TAPPI Test Method T538. Comparison of the gloss of coated paper according to the invention was made or compared to a paper with conventional titanium dioxide coating and presented in FIG. 21.

Example 11

Preparation of Paper Handsheets

Refined mixed northern hardwood and southern softwood were used as the furnish. The hardwood contained 1.9% carbonate as buffer. The conventional titanium dioxide Ti-Pure R796+ available from Dupont and the encapsulated titanium dioxide from Example 2 were added at 100, 200, 400, and 800 lb/ton. Retention chemistry consisted of cationic starch, alum, and anionic polymer was used. Handsheets were made to TAPPI standard weight of 60 gram per square meter.

Example 12

Test of Opacity of Paper

The opacity of the paper handsheets from Example 10 was measured with an opacimeter (Model BNL-3, manufactured by Technidyne Corporation, New Albany, Ind.). Comparison of opacity of paper coating according to the invention with conventional titanium dioxide coating is presented in FIG. 22.

Example 13

Test of Brightness of Paper

The brightness of the paper handsheets from Example 10 was measured with a Color Touch 2, Model ISO, manufactured by Technidyne Corporation, New Albany, Ind. Comparison of brightness (UV excluded) of paper coating according to the invention with conventional titanium dioxide coating is presented in FIG. 23.

For comparison, Table 3 presents Einlehner abrasion values reported in the literature by others for conventional titanium dioxides.

| Bronze Einlehner Abrasion of Several Pigments | |
|---|---|
| Pigment | Einlehner* (mg) |
| Rutile-Coated | 44.2 |
| Rutile-A" | 39.6 |
| Anatase-A | 32.6 |
| Rutile-A | 31.8 |
| Rutile-C | 15.9 |
| Anatase-B | 11.6 |
| Anatase-C | 9.0 |
| Anatase-D | 8.4 |
| CaCO$_3$(ppt) | 5.8 |

*Averaged value of at least three test results.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A coated paper comprising:
   a base paper having a coating thereon,
   wherein said coating comprises a binder and a stanchion-encapsulated pigment,
   wherein the pigment comprises particles of titanium dioxide and having an average of 0.2 to 6 stanchions per particle of titanium dioxide and an average stanchion length is within the range of 10 to 500 nm,
   wherein the average stanchion lengths of the encapsulated pigment ranges from 0.01 d to 3.5 d where "d" is the encapsulated pigment diameter,
   wherein said stanchion-encapsulated pigment comprises 1-30% by weight of said coating,
   wherein the stanchion-encapsulated pigment contains a polymeric encapsulating material that comprises a polymer selected from the group consisting of: polyacrylate, polymethacrylate, polyalkyl(meth)acrylate and combinations thereof,
   wherein each stanchion protrudes at least two times the thickness of the encapsulating material or connects two or more particles together, and
   wherein the stanchion and polymeric encapsulating material are the same material.

2. The coated paper according to claim 1, wherein the pigment material is 40 to 60% of the weight of said stanchion-encapsulated pigment.

3. The coated paper according to claim 1, wherein said stanchion-encapsulated titanium dioxide is present in an amount that provides titanium dioxide in the range of 2 to 10 wt % of said coating.

4. The coated paper according to claim 1, wherein said coated paper has a brightness that is at least 99.7% the brightness of a comparative coated paper that is otherwise identical in composition and formation but which replaces the stanchion-encapsulated titanium dioxide with non-encapsulated titanium dioxide and which uses twice the amount of titanium dioxide in comparison to the amount of titanium dioxide provided by said stanchion-encapsulated titanium dioxide.

5. The coated paper according to claim 1, wherein said coated paper has an opacity equivalent to or better as compared to a coated paper using a substantially equivalent non-encapsulated titanium dioxide.

6. The coated paper according to claim 1, wherein equivalent or better gloss is achieved but using 75% or less of the stanchion-encapsulated pigment as compared to a coated paper using a substantially equivalent non-encapsulated titanium dioxide.

7. The coated paper according to claim 1, wherein equivalent or higher gloss is achieved using lower calendar pressure with the paper using stanchion-encapsulated pigment as compared to a coated paper using non-encapsulated titanium dioxide.

8. The coated paper according to claim 1, wherein the pigment is a rutile titanium dioxide and said coated paper has an Einlehner Abrasion of less than 10 mg.

9. The coated paper according to claim 1, wherein said coated paper has an Einlehner abrasion value at least 50% less when compared to the Einlehner value of a coated paper using an equivalent amount of the same titanium dioxide which is non-encapsulated.

10. The coated paper according to claim 1, wherein the coated paper has a Sheffield Smoothness equivalent to or better than coated paper using 2× by weight of a substantially equivalent non-encapsulated titanium dioxide.

11. The coated paper according to claim 1, wherein said binder is selected from the group consisting of starch, a vinyl alcohol, a latex, a carboxymethylcellulose, and combinations thereof.

12. The coated paper according to claim 1, wherein said coating further comprises at least one pigment selected from calcium carbonates, clays, and combinations thereof.

13. The coated paper according to claim 1, wherein said coating further comprises at least one additive selected from surfactants, dispersants, lubricants, thickeners, anti-foaming agents, opacifying agents, and optical brightening agents.

14. A paper coating composition, comprising a mixture of water, a binder, and stanchion-encapsulated pigment,
wherein said stanchion-encapsulated pigment comprises 1-30% by weight of said coating,
wherein the stanchion-encapsulated pigment contains a polymeric encapsulating material that comprises a polymer selected from the group consisting of: polyacrylate, polymethacrylate, polyalkyl(meth)acrylate and combinations thereof,
wherein each stanchion protrudes at least two times the thickness of the encapsulating material or connects two or more particles together, and
wherein the stanchion and polymeric encapsulating material are the same material.

15. The coating composition according to claim 14, wherein a pigment material in the stanchion-encapsulated pigment is titanium dioxide.

16. The coating composition according to claim 14, further comprising at least one pigment selected from calcium carbonates, clays, and combinations thereof.

17. A paper product produced by coating a base paper with the coating composition of claim 14, claim 15 or claim 16.

18. The paper product according to claim 17, wherein said paper is subjected to calendaring after said coating.

19. The paper product according to claim 17, wherein said paper is not subjected to calendaring after said coating.

20. A paper comprising:
cellulose pulp; and
filler,
wherein the filler comprises a stanchion-encapsulated pigment,
wherein said stanchion-encapsulated pigment comprises 1-30% by weight of said coating,
wherein the pigment comprises particles of titanium dioxide and having an average of 0.2 to 6 stanchions per particle of titanium dioxide and an average stanchion length is within the range of 10 to 500 nm, and
wherein each stanchion protrudes at least two times the thickness of the encapsulating material or connects two or more particles together.

21. The paper according to claim 20, wherein the paper at a loading level of 50% by weight or less of stanchion-encapsulated titanium dioxide as compared to a paper using a same or similar non-encapsulated titanium dioxide has an opacity which is equivalent or higher than the paper using a non-encapsulated titanium dioxide.

22. The paper according to claim 20, wherein the paper using stanchion-encapsulated titanium dioxide at an equivalent loading level or less, has a higher brightness as compared to a paper using the same or similar titanium dioxide which is non-encapsulated.

* * * * *